US012568354B2

(12) United States Patent
Ståhl et al.

(10) Patent No.: US 12,568,354 B2
(45) Date of Patent: Mar. 3, 2026

(54) DOWNLOAD OF OPERATIONAL SUBSCRIPTION PROFILE

(71) Applicant: Telefonaktiebolaget LM Ericsson (publ), Stockholm (SE)

(72) Inventors: Per Ståhl, Klagshamn (SE); Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 18/275,479

(22) PCT Filed: Feb. 5, 2021

(86) PCT No.: PCT/EP2021/052860
§ 371 (c)(1),
(2) Date: Aug. 2, 2023

(87) PCT Pub. No.: WO2022/167092
PCT Pub. Date: Aug. 11, 2022

(65) Prior Publication Data
US 2024/0314538 A1 Sep. 19, 2024

(51) Int. Cl.
*H04W 8/00* (2009.01)
*H04W 8/18* (2009.01)
(Continued)

(52) U.S. Cl.
CPC ......... *H04W 8/183* (2013.01); *H04W 12/041* (2021.01); *H04W 12/72* (2021.01)

(58) Field of Classification Search
CPC ... H04W 8/183; H04W 12/72; H04W 12/041; H04W 455/411
See application file for complete search history.

(56) References Cited

U.S. PATENT DOCUMENTS

2016/0295544 A1* 10/2016 Jiang ..................... H04W 12/35
2017/0289788 A1* 10/2017 Lalwaney ............... H04W 8/24
(Continued)

OTHER PUBLICATIONS

GSMA , "Remote Provisioning Architect re for Embedded UICC Technical Specification", Version 4.2, 1-452, Jul. 7, 2020.
(Continued)

*Primary Examiner* — Khai M Nguyen
(74) *Attorney, Agent, or Firm* — Sage Patent Group

(57) ABSTRACT

There is provided mechanisms for downloading an operational subscription profile to a communication device. A method is performed by the communication device. The communication device has an EID and is provided with a provisioning subscription profile. The method comprises obtaining a temporary PSI for the provisioning subscription profile, wherein the temporary PSI is based on the EID. The method comprises providing, whilst using the provisioning subscription profile, the temporary PSI to a first MNO as part of performing network attachment with the first MNO. The first MNO is selected based on the temporary PSI. The method comprises obtaining, whilst using the provisioning subscription profile and as part of performing network access authentication for the network attachment, an operational PSI from an eSIM server via the first MNO. The method comprises providing, whilst using the provisioning subscription profile, the operational PSI to a second MNO as part of establishing initial network connectivity with the second MNO. The second MNO is selected based on the operational PSI. The method comprises downloading, whilst using the initial network connectivity and the provisioning subscription profile, the operational subscription profile from the eSIM server via the second MNO to the communication device.

19 Claims, 18 Drawing Sheets

(51) Int. Cl.
    *H04W 12/041*      (2021.01)
    *H04W 12/72*       (2021.01)

(56)                References Cited

U.S. PATENT DOCUMENTS

| | | | |
|---|---|---|---|
| 2018/0146361 A1* | 5/2018 | Jiang ....................... | H04W 4/02 |
| 2019/0349743 A1 | 11/2019 | Hamblet | |
| 2019/0373448 A1* | 12/2019 | Gao .................... | H04W 12/062 |
| 2020/0008049 A1* | 1/2020 | Namiranian ...... | H04W 12/0433 |
| 2020/0267521 A1* | 8/2020 | Bruner .................. | H04L 9/3247 |
| 2020/0344594 A1* | 10/2020 | Larignon ............. | H04W 12/42 |
| 2021/0092603 A1* | 3/2021 | Yang .................... | H04L 9/0844 |
| 2022/0078602 A1* | 3/2022 | Tait .......................... | G06F 8/65 |

OTHER PUBLICATIONS

GSMA , "SGP.22 RSP Technical Specification", Version 2.2.2, Jun. 5, 2020, 1-268.

\* cited by examiner 1310a,
1310b 1320a,
1320b

1330

DOWNLOAD OF OPERATIONAL SUBSCRIPTION PROFILE

TECHNICAL FIELD

Embodiments presented herein relate to a method, a communication device, a computer program, and a computer program product for downloading an operational subscription profile to a communication device. Embodiments presented herein further relate to a method, an eSIM server, a computer program, and a computer program product for enabling download of an operational subscription profile to a communication device.

BACKGROUND

GSMA (Global System for Mobile Communications Association) has developed specifications to provide network subscribers with third generation partnership program (3GPP) subscription profiles, so called SIM profiles (where SIM is short for subscriber identity module or subscriber identification module), which can be remotely downloaded over the Internet to the physical hardware, known as embedded universal integrated circuit card (eUICC) or integrated universal integrated circuit card (iUICC), in the communication device. The specifications are referred to as eSIM. Two variants of eSIM are specified; one for IoT/M2M devices (GSMA SGP.02 Remote Provisioning Architecture for Embedded UICC, Technical Specification, Version 4.2) and one for consumer devices (GSMA SGP.22 RSP Technical Specification, Version 2.2.2). The latter is also currently being considered for use with communication devices in terms of Internet of Things (IoT) devices due to the complexity of the M2M eSIM variant. In order to remotely download a new subscription, connectivity is needed for the communication device to be able to communicate with the remote provisioning server. This may either be a cellular connectivity (applicable for both M2M and consumer eSIM variants) or a non-cellular connectivity using an additional radio (only applicable for consumer eSIM variant). For low-cost constrained IoT devices, the introduction of an additional radio, which may be used only once to download a first subscription profile, adds both extra hardware and complexity to the communication device, in addition to adding cost. The use of cellular connectivity implies that a SIM profile must already be present at the communication device. In particular, to gain initial connectivity when the communication device starts up for the first time, a suitable SIM profile that works where the communication device is located needs to be installed into the communication device at manufacturing. Such a SIM profile is hereinafter referred to as a provisioning subscription profile, or bootstrap subscription profile.

It is often not known when the communication devices are manufactured where a particular communication device will be deployed. For this reason, a provisioning subscription profile of a mobile network operator (MNO) with global roaming agreements is needed if the communication device should be able to connect to the mobile network using this provisioning profile. A user or enterprise may use an eSIM service to decide for each of its communication devices a proper operational subscription profile. Based on geographical location of the communication device, knowledge of pre-negotiated agreements with MNOs, device information, etc., the eSIM service is used to perform a localization procedure to determine the proper MNO, provisioning server, and an operational subscription profile to be used for a particular communication device. This eSIM service may for example be triggered as the communication device boots up for the first time. Upon successful localization, the communication device is triggered to download of the operational subscription profile from the provisioning server. The eSIM service as of today requires each enterprise to have relation(s) with MNO(s) with large global roaming agreements.

One alternative is for the provider of the eSIM service to also provide an eSIM bootstrap connectivity service, where for such an eSIM bootstrap connectivity service a provisioning subscription profile is provided, from one or more MNO with global roaming agreement, for every communication device that uses the eSIM service such that each communication device can obtain initial connectivity and connect to the eSIM service. Having a dedicated provisioning subscription profile per communication device is a costly solution as there might be millions, or even billions, of communication devices using such a service.

Hence, there is still a need for techniques for efficient download of operational subscription profiles to communication devices.

SUMMARY

An object of embodiments herein is to enable efficient download of operational subscription profiles to communication devices.

According to a first aspect there is presented a method for downloading an operational subscription profile to a communication device. The method is performed by the communication device. The communication device has an EID and is provided with a provisioning subscription profile. The method comprises obtaining a temporary PSI for the provisioning subscription profile, wherein the temporary PSI is based on the EID. The method comprises providing, whilst using the provisioning subscription profile, the temporary PSI to a first MNO as part of performing network attachment with the first MNO. The first MNO is selected based on the temporary PSI. The method comprises obtaining, whilst using the provisioning subscription profile and as part of performing network access authentication for the network attachment, an operational PSI from an eSIM server via the first MNO. The method comprises providing, whilst using the provisioning subscription profile, the operational PSI to a second MNO as part of establishing initial network connectivity with the second MNO. The second MNO is selected based on the operational PSI. The method comprises downloading, whilst using the initial network connectivity and the provisioning subscription profile, the operational subscription profile from the eSIM server via the second MNO to the communication device.

According to a second aspect there is presented a communication device for downloading an operational subscription profile to the communication device. The communication device has an EID and is provided with a provisioning subscription profile. The communication device comprises processing circuitry. The processing circuitry is configured to cause the communication device to obtain a temporary PSI for the provisioning subscription profile, wherein the temporary PSI is based on the EID. The processing circuitry is configured to cause the communication device to provide, whilst using the provisioning subscription profile, the temporary PSI to a first MNO as part of performing network attachment with the first MNO. The first MNO is selected based on the temporary PSI. The processing circuitry is configured to cause the communication device to obtain, whilst using the provisioning subscription profile and as part of performing network access authentication for the network attachment, an operational PSI from an eSIM server via the first MNO. The processing circuitry is configured to cause the communication device to provide, whilst using the provisioning subscription profile, the operational PSI to a second MNO as part of establishing initial network connectivity with the second MNO. The second MNO is selected based on the operational PSI. The processing circuitry is configured to cause the communication device to download, whilst using the initial network connectivity and the provisioning subscription profile, the operational subscription profile from the eSIM server via the second MNO to the communication device.

According to a third aspect there is presented a computer program for downloading an operational subscription profile to a communication device. The computer program comprises computer program code which, when run on processing circuitry of a communication device, causes the communication device to perform a method according to the first aspect.

According to a fourth aspect there is presented a method for enabling download of an operational subscription profile to a communication device. The method is performed by an eSIM server. The eSIM server has access to a list of EIDs and information of a temporary PSI for each EID in the list. The method comprises obtaining, from the communication device using a provisioning subscription profile and having an EID from the list of EIDs, one of the temporary PSIs as part of network attachment being performed between the communication device and a first MNO. The method comprises obtaining, from the temporary PSI, the EID of the communication device. The method comprises obtaining an operational subscription profile and an operational PSI for the communication device based on the EID of the communication device. The method comprises providing the operational PSI towards the communication device as part of performing network access authentication for the network attachment. The method comprises enabling download, upon an initial network connectivity having been established for the communication device using the provisioning subscription profile and the operational PSI, of the operational subscription profile to the communication device.

According to a fifth aspect there is presented an eSIM server for enabling download of an operational subscription profile to a communication device. The eSIM server has access to a list of EIDs and information of a temporary PSI for each EID in the list. The eSIM server comprises processing circuitry. The processing circuitry is configured to cause the eSIM server to obtain, from the communication device using a provisioning subscription profile and having an EID from the list of EIDs, one of the temporary PSIs as part of network attachment being performed between the communication device and a first MNO. The processing circuitry is configured to cause the eSIM server to obtain, from the temporary PSI, the EID of the communication device. The processing circuitry is configured to cause the eSIM server to obtain an operational subscription profile and an operational PSI for the communication device based on the EID of the communication device. The processing circuitry is configured to cause the eSIM server to provide the operational PSI towards the communication device as part of performing network access authentication for the network attachment. The processing circuitry is configured to cause the eSIM server to enable download, upon an initial network connectivity having been established for the communication device using the provisioning subscription profile and the operational PSI, of the operational subscription profile to the communication device.

According to an sixth aspect there is presented a computer program for enabling download of an operational subscription profile to a communication device, the computer program comprising computer program code which, when run on processing circuitry of an eSIM server, causes the eSIM server to perform a method according to the fourth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

Advantageously, these aspects provide efficient download of operational subscription profiles to communication devices.

Advantageously, these aspects completely remove scaling issue of temporary subscriptions (and temporary IMSIs) by directly using the subscription linked to the operational subscription profile.

Advantageously, these aspects enable the cost for data for the downloading the operational subscription profile to be allocated to the MNO providing the operational subscription profile and then automatically charged to the enterprise paying for that subscription.

Advantageously, these aspects enable credentials in terms of Ki and OPc for use when performing network access authentication when attaching to the network for the download of the operational subscription profile to be handled in a flexible way. This enables the inventive concept to be deployed in different scenarios depending on if the eSIM bootstrap connectivity service is part of an eSIM service with closer relation to MNOs and a provisioning server or not.

Advantageously, these aspects enable one common provisioning subscription profile to be used for many identity modules, thus reducing the total number of provisioning subscription profiles needed.

In the MVNO case, the proposed solution allows the use of the full IMSI range which means the risk of collision is very small. For the case of using a range from an MNO it depends on the size of the range how frequently collisions will occur.

Advantageously, these aspects enable the size of the provisioning subscription profile to be kept very small. In some examples the provisioning subscription profile only needs to store the mobile country code (MCC) and the mobile network code (MNC) of the eSIM bootstrap connectivity service (or mobile network used by the eSIM bootstrap connectivity service), the public key of the eSIM bootstrap connectivity service (and possibly also the public key of the provisioning server), and instructions for how to obtain the operational IMSI and associated credentials.

Advantageously, these aspects enable an eSIM bootstrap connectivity service to have full control over IMSI, Ki, and OPc values and information about failed connection attempts for the communication device. This information can be provided to the enterprise owning the communication devices to be used for trouble shooting.

Advantageously, these aspects do not require any changes to the modem in the communication device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
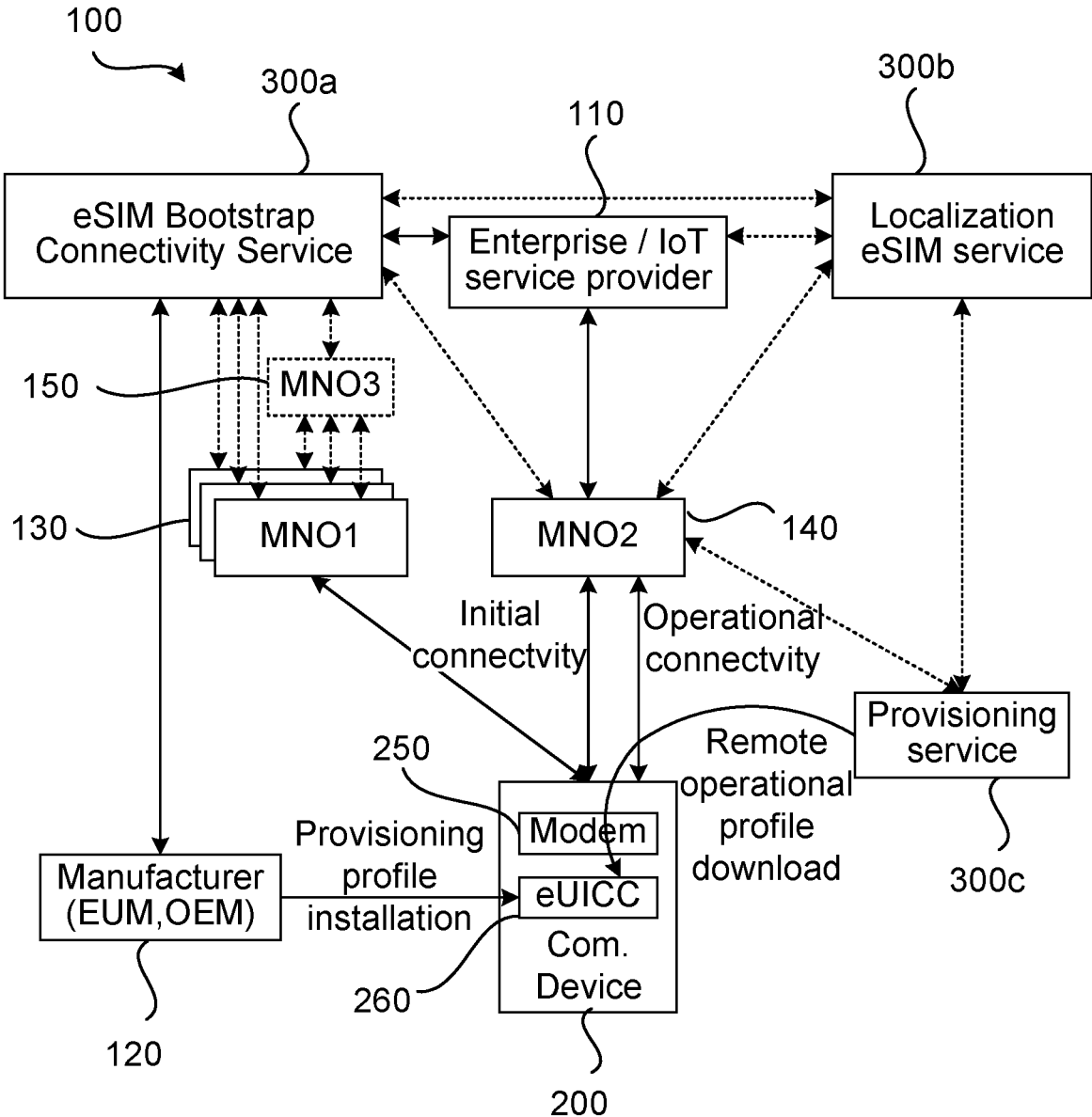
FIG. 1 is a schematic diagram illustrating a communication network according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The wording that a certain data item or piece of information is obtained by a first device should be construed as that data item or piece of information being retrieved, fetched, received, or otherwise made available to the first device. For example, the data item or piece of information might either be pushed to the first device from a second device or pulled by the first device from a second device. Further, in order for the first device to obtain the data item or piece of information, the first device might be configured to perform a series of operations, possible including interaction with the second device. Such operations, or interactions, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the first device.

The wording that a certain data item or piece of information is provided by a first device to a second device should be construed as that data item or piece of information being sent or otherwise made available to the second device by the first device. For example, the data item or piece of information might either be pushed to the second device from the first device or pulled by the second device from the first device. Further, in order for the first device to provide the data item or piece of information to the second device, the first device and the second device might be configured to perform a series of operations in order to interact with each other. Such operations, or interaction, might involve a message exchange comprising any of a request message for the data item or piece of information, a response message comprising the data item or piece of information, and an acknowledge message of the data item or piece of information. The request message might be omitted if the data item or piece of information is neither explicitly nor implicitly requested by the second device.

As noted above, there is a need for techniques enabling efficient download of operational subscription profiles to communication devices.

According to a first alternative, a set of statically allocated subscriptions is used for initial connectivity. These subscriptions can be reused by several communication devices for the bootstrap. This first alternative could make use of a pool of a few hundred subscriptions from a set of MNOs with global roaming agreements. According to this first alternative, each communication device could be provisioned with a common provisioning subscription profile that could comprise an applet that is configured with a template SIM profile and the IMSI and Ki (and OPc value(s)) for use in the Authentication and Key Agreement (AKA) network access authentication algorithm of each of the few hundred subscriptions. The applet selects, in some way, one subscription (one {IMSI, Ki, OPc}-tuple) from the pool for use when the communication device tries to attach to a cellular network and request IMSI and AKA-based authentication from the eUICC.

One issue with the first alternative is that collisions might occur if several communication devices are simultaneously deployed for example in the same country. This can cause authentication issues and blocking. For example, the visiting network can discover that several communication devices are using the same IMSI at the same time and block these communication devices. Alternatively, the home network may notice that several authentications are performed with the same IMSI in parallel or from two different places far apart in the world with only a short time in between and may decide to lock the subscription. Even though intelligent algorithms may be used such that the communication devices retry to attach with another subscription, the limited number of subscriptions may still be an issue. Increasing the number of subscriptions to avoid collisions also increases the required storage in the provisioning subscription profile in the eUICC. The eSIM bootstrap connectivity service provider has no control over IMSI, Ki, and OPc values, which means less chance to get IMSI number ranges to limit the storage space. Furthermore, it is required to be able to retrieve the Ki and OPc values from the MNO to be able to construct the applet. Since network authentication is performed by an MNO, information is not provided to the eSIM bootstrap connectivity service provider about failed attempts by communication devices to connect.

According to a second alternative there is a pool of IMSIs configured in a provisioning subscription profile common for all communication devices using the eSIM bootstrap connectivity service and that are used in the establishment of initial connectivity, but where these IMSIs are linked to subscriptions that do not allow any transfer of user data. According to the second alternative, these IMSIs are only used to route the attaching communication device to a home network where the eSIM bootstrap connectivity service provider is in control of the network attachment authentication, at least for the particular pool of IMSIs. The eSIM bootstrap connectivity service provider may here download another temporary IMSI through the network attachment authentication vector (AV) to the communication device. The subscription linked to this temporary IMSI offers user data traffic and is used by the communication device for the download of the operational subscription profile. The temporary IMSI may belong to one or more pools of subscriptions that the eSIM bootstrap connectivity service provider has and that may be dynamically updated. For example, a dynamic update might be performed as MNOs are added to (or removed from) the eSIM service. Pools of temporary subscriptions may be used, or offered, by the same MNOs that also offers operational subscriptions.

For the second alternative, the issue of storage of {IMSI, Ki, and OPc}-values for all the temporary subscriptions in the provisioning subscription profile in the eUICC is completely removed. The selected temporary IMSI is downloaded over the air together with a seed and the corresponding Ki and OPc values are derived by the communication device using the seed and information available in the provisioning subscription profile. A description of the set of statically allocated IMSIs that are used during the download of the temporary IMSI is all what is required to be stored. If this set constitutes a range, only the first and last number in the range need to be stored. Yet, collisions can still occur in the first phase where a static IMSI is used. How large this set of static IMSIs is determines how frequently such collisions would occur together with the number of devices currently using the service. However, the time period where a temporary IMSI belonging to the static range is used is much shorter than in the first alternative where the temporary IMSI is also used for the download of the operational subscription profile.

The second alternative requires more steps (and hence has higher implementational complexity) than the first alternative. Like in the first alternative, there is a need for a pool of temporary subscriptions and a scaling problem of how many temporary IMSIs (or temporary subscriptions) are needed. For storage and cost purposes, the number of temporary IMSIs should be kept to a minimum, but the larger number of communication devices using the eSIM service, the larger number of temporary IMSIs is required. To keep the number of temporary IMSIs as low as possible, the temporary IMSIs need to be able to be re-used as quickly as possible. The Ki and OPc according to the second alternative are unique per session, which requires update in the Home Subscriber Server (HSS), or similar network node depending on generation of the 3GPP cellular standard, after each use of the temporary subscription which adds to the time before a temporary IMSI can be re-used. To save storage and cost, the temporary IMSIs (temporary subscriptions) should ideally be local ones where the communication devices are being deployed, but this is also something that changes as different communication devices from different enterprises are being deployed over time.

Hence, there is still a need for techniques enabling efficient download of operational subscription profiles to communication devices.

The embodiments disclosed herein therefore relate to mechanisms for downloading an operational subscription profile to a communication device and enabling download of an operational subscription profile to a communication device. In order to obtain such mechanisms there is provided a communication device, a method performed by the communication device 200, a computer program product comprising code, for example in the form of a computer program, that when run on processing circuitry of the communication device, causes the communication device 200 to perform the method. In order to obtain such mechanisms there is further provided an eSIM server, a method performed by the eSIM server 30, and a computer program product comprising code, for example in the form of a computer program, that when run on processing circuitry of the eSIM server, causes the eSIM server to perform the method.

FIG. 1 is a schematic diagram illustrating a communications network 100 where embodiments presented herein can be applied. In FIG. 1, dashed lines indicate connections that may be optional depending on the eSIM service and eSIM bootstrap connectivity service integration.

The communication device 200 comprises radio circuitry in the form of a modem 250 and an identity module. In FIG. 1 the identity module is embodied in form of an eUICC 260, but the identity module could alternatively be and iUICC, a UICC with RSP support, or a Smart Secure Platform (SSP). Without loss of generality, the eUICC 260 will hereinafter represent the identity module. The modem is used by the communication device 200 to connect to a mobile network (as defined by any of MNOs 130, 140, 150) based on which subscription profile is active in the identity module. For the first start-up of the communication device, the provisioning subscription profile is active and provides initial connectivity. Initial connectivity is established using a first mobile network (represented by the first MNO 130) and a second mobile network (represented by the second MNO 140). The first mobile network and the second mobile network might be one and the same mobile network. Using the remote SIM provisioning mechanism, the communication device 200 may then be provisioned with an operational subscription profile from the second mobile network. After this operational subscription profile has been activated, it is used to provide operational network connectivity for the communication device. The identity module supports remote SIM provisioning according the aforementioned GSMA eSIM specification (either the M2M variant or the consumer variant, or both). The identity module contains credentials for secure profile download from the provisioning server 300c. The credentials include an elliptic curve private key and an identity module certificate (such as an eUICC certificate) containing the corresponding public key. The identity module certificate also contains a device identifier (EID), such as an eUICC Identifier. The identity module is provisioned with a provisioning subscription profile at manufacturing/personalization or module/device manufacturing by the manufacturer 120. The provisioning subscription profile is provided by an eSIM bootstrap connectivity service provider and is a template subscription profile. The provisioning subscription profile might be preconfigured with permanent subscription identifier (PSI) information. As a non-limiting example, the provisioning subscription profile might comprise a statically allocated range of IMSIs and a public key of the eSIM bootstrap connectivity server 300a operated by the eSIM bootstrap connectivity service provider (and/or a public key of the provisioning server 300c in case the eSIM bootstrap connectivity server 300a is part of a full eSIM service). The provisioning subscription profile selects an IMSI from the IMSI range depending on the EID of the identity module where it resides. In this way the IMSI provides information to eSIM bootstrap connectivity server 300*a* about the particular identity module.

Each of a first MNO 130, a second MNO 140, and a third MNO 150 might be known as a respective (Communications) Service Provider ((C) SP) and provides cellular connectivity for the communication device 200. The eSIM bootstrap connectivity service provider, in case of being a mobile virtual network operator (MVNO), has roaming agreements with a set of MNOs (represented by the first MNO 130) that assist in providing initial connectivity for the communication device 200 using the eSIM bootstrap connectivity server 300*a*.

The eSIM bootstrap connectivity service provider provides a service to enterprises, IoT service providers, device owners, and end-users. This service might be part of a full eSIM service. The eSIM bootstrap connectivity service is provided through an eSIM bootstrap connectivity server 300*a*. The eSIM bootstrap connectivity server 300*a* uses a statically allocated range of IMSIs for the initial connectivity of the communication device 200. The statically allocated range depends on if the eSIM bootstrap connectivity service provider is a Mobile Virtual Network Operator (MVNO) or uses a range of IMSIs from an MNO (represented by the third MNO 150) with which it has an agreement. In the first case, the eSIM bootstrap connectivity service provider owns an MCC+MNC combination and is in complete control of how the rest of the 10 digits of the 15-digit IMSI is used. For example, the full range defined by the 10 digits defines the statically allocated range of IMSIs described above. In the latter case the IMSI range is typically shorter, and the IMSIs defined by the range are not necessarily linked to real subscriptions of the third MNO, i.e. they do not necessarily allow any transfer of user data.

The eSIM bootstrap connectivity server 300*a* serves as the home mobile network when the communication device 200 connects to a first mobile network (i.e. visiting mobile network) during its first start-up to gain initial connectivity. The eSIM bootstrap connectivity server 300*a* is in control of the network access authentication for the set of IMSIs in the statically allocated IMSI range. The eSIM bootstrap connectivity server 300*a* provides authentication vectors for use in the network access authentication. An Home Location Register (HLR) and Authentication Centre (AuC)/HSS/Authentication Server Function (AUSF) and Unified Data Management (UDM), depending on which generation of the 3GPP cellular standard (hereinafter represented by the HSS), is used to store data about the communication devices that is currently using the service of the eSIM bootstrap connectivity server 300*a* from which AVs are computed. For each communication device comprising an identity module currently using the service of the eSIM bootstrap connectivity server 300*a*, the eSIM bootstrap connectivity server 300*a* stores in its database the identity module certificate, EID, and the corresponding IMSI value such that the identity module certificate can be retrieved based upon a received IMSI. The identity module certificate contains the EID from which the IMSI is derived. The eSIM bootstrap connectivity service provides a provisioning subscription profile that is common for all communication devices 200 using the service and that is installed during identity module manufacturing/personalization (or possibly module/device manufacturing depending on the type of identity module).

As part of providing initial connectivity it is necessary to determine the proper MNO to provide the operational subscription profile for a particular communication device 200. This is referred to as a localization process. The localization process is handled by the eSIM localization server 300*b*. For example, based on geographical location of the communication device 200, knowledge of pre-negotiated agreements with MNOs, device information, etc., the proper MNO, provisioning server, and subscription profile to be used are determined. In a first option the eSIM localization server 300*b* is part of an eSIM service where the eSIM localization server 300*b* is managing connectivity for a set of MNOs and handles the interaction with provisioning servers on behalf of the MNOs. A provisioning server used for provisioning of operational profiles may even be offered by the eSIM service provider. In the first option the eSIM localization server 300*b* also updates/controls the HSS of the MNOs. In a second option the eSIM localization server 300*b* is performing the localization based on input data, and the enterprise itself is handling interaction with MNOs. Other options are also possible. The eSIM bootstrap connectivity server 300*a* may either be closely connected to the eSIM localization server 300*b* (or part of it), e.g. in the first option, or it may have no relation and only use a localization interface to trigger localization and receive information about the chosen operational subscription profile. Such interaction may also be via the enterprise.

The provisioning server 300*c* (implementing the functionality of a Subscription Manager Data Preparation (SM-DP) server and a Subscription Manager Secure Routing (SM-SR) server in case of the M2M variant and the functionality of an enhanced SM-DP (SM-DP+) in case of the consumer variant) handles profile download to the communication device 200. The provisioning server 300*c* is either operated by the MNO providing the operational subscription profile to be downloaded (represented by the second MNO 140) or a third party trusted by this MNO such as the eSIM service provider.

The eSIM bootstrap connectivity server 300*a*, the eSIM localization server 300*b*, and the provisioning server 300*c* might be part of an eSIM server 300.

Enterprises, IoT service providers, device owners or end-users 110 that are using the eSIM bootstrap connectivity server 300*a* might order operational subscription profile(s) for their communication devices from an MNO (represented by the second MNO 140). This MNO interacts with the provisioning server 300*c* for the preparation of operational subscription profiles for remote download to the communication devices. Upon successful download and activation of the operational subscription profile into the communication device, the MNO provides cellular connectivity for the communication device.

Figure 2:
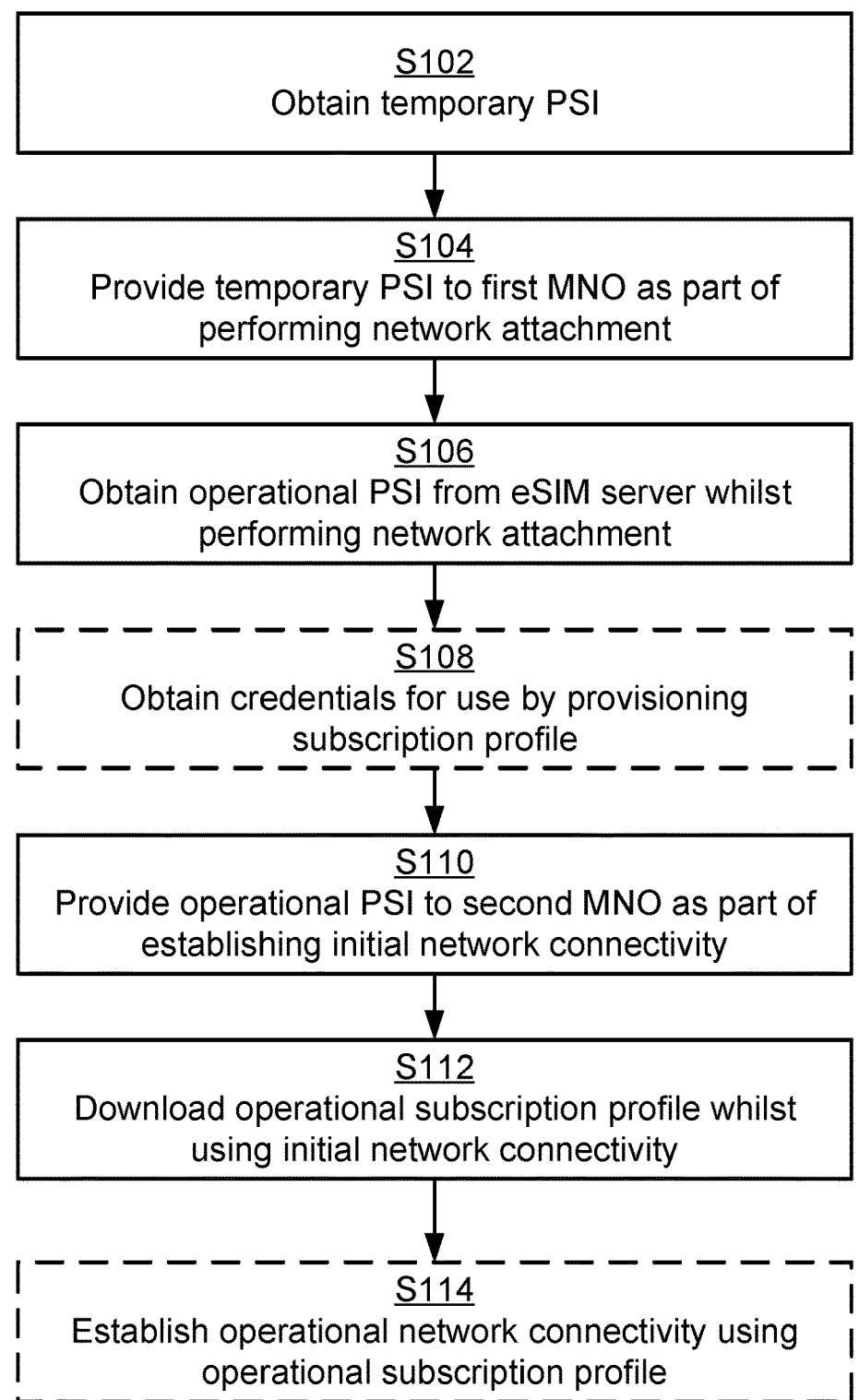
FIGS. 2 and 3 are flowcharts of methods according to embodiments.

Reference is now made to FIG. 2 illustrating a method for downloading an operational subscription profile to a communication device 200 as performed by the communication device 200 according to an embodiment. The communication device 200 has an EID and is provided with a provisioning subscription profile.

S102: The communication device 200 obtains a temporary PSI for the provisioning subscription profile, wherein the temporary PSI is based on the EID.

S104: The communication device 200 provides, whilst using the provisioning subscription profile, the temporary PSI to a first MNO 130 as part of performing network attachment with the first MNO 130. The first MNO 130 is selected based on the temporary PSI.

S106: The communication device 200 obtains, whilst using the provisioning subscription profile and as part of performing network access authentication for the network attachment, an operational PSI from an eSIM server 300 via the first MNO 130.

S110: The communication device 200 provides, whilst using the provisioning subscription profile, the operational PSI to a second MNO 140 as part of establishing initial network connectivity with the second MNO 140. The second MNO 140 is selected based on the operational PSI.

S112: The communication device 200 downloads, whilst using the initial network connectivity and the provisioning subscription profile, the operational subscription profile from the eSIM server 300 via the second MNO 140 to the communication device 200.

Embodiments relating to further details of downloading an operational subscription profile to the communication device 200 as performed by the communication device 200 will now be disclosed.

As will be further disclosed below, in some aspects, the IMSI is the permanent subscription identifier. That is, in some embodiments, the PSI is an IMSI.

As will be further disclosed below, in some aspects, the provisioning subscription profile is preconfigured with PSI information, such as a range of IMSIs, and the temporary PSI is derived by the communication device using the EID and the PSI information. That is, in some embodiments, the provisioning subscription profile is preconfigured with PSI information and the temporary PSI is derived by the communication device using the EID and PSI information.

As will be further disclosed below, in some aspects, the EID in the IMSI is a truncated hash of the EID. That is, in some embodiments, the temporary IMSI comprises a truncated hash of the EID.

As will be further disclosed below, in some aspects, the EID is delivered in a Subscription Concealed Identifier (SUCI), where the SUCI comprises a protected Subscription Permanent Identifier (SUPI), the EID is part of the protected SUPI, and the SUCI is calculated in the eUICC 260. That is, in some embodiments, the temporary PSI is a subscription permanent identifier, SUPI, where the SUPI comprises the EID, where the SUPI is encrypted and integrity protected and provided as part of a SUCI to the first MNO 130, and where the SUCI is calculated by the provisioning subscription profile.

The operational subscription profile might be used for data communication. In particular, in some embodiments, the communication device 200 is configured to perform (optional) step S114:

S114: The communication device 200 establishes, with the second MNO 140, an operational network connectivity using the operational subscription profile for data communication with the second MNO 140.

As will be further disclosed below, in some aspects, the identity module of the communication device 200 is provisioned with keys for download of the operational subscription profile. That is, in some embodiments, the communication device 200 is provisioned with a private key and certificate for use in download of subscription profiles.

In some embodiments, the provisioning subscription profile comprises a public key of the eSIM server 300.

As will be further disclosed below, in some aspects, the communication device 200 obtains credentials used for network access authentication. In particular, in some embodiments, the communication device 200 is configured to perform (optional) step S108:

S108: The communication device 200 obtains, whilst using the provisioning subscription profile, credentials in terms of a shared secret, Ki, between the communication device 200 and the second MNO 140 and an operator-specific constant, OPc, for use by the provisioning subscription profile as part of network access authentication for establishing the initial network connectivity.

As will be further disclosed below, in some aspects, Ki and OPc are identical for the provisioning subscription profile and the operational subscription profile. That is, in some embodiments, the values of the credentials are identical to the values of the credentials for the operational subscription profile.

As will be further disclosed below, in some aspects, Ki and OPc are based e.g. on a private-public key pair of the eSIM server 300. That is, in some embodiments, obtaining the credentials comprises deriving the credentials from the private key of the communication device 200 and the public key of the eSIM server 300.

As will be further disclosed below, in some aspects, Ki and OPc are independent from properties of the eSIM server 300. That is, in some embodiments, the values of the credentials are independent from properties of the eSIM server 300.

As will be further disclosed below, in some aspects, Ki and OPc are delivered together with the operational IMSI as part of the network access authentication. That is, in some embodiments, the credentials are obtained by the communication device 200 together with the operational PSI as part of performing network access authentication for the network attachment.

As will be further disclosed below, in some aspects, the operational PSI and credentials are encrypted and integrity protected. That is, in some embodiments, the operational PSI and credentials are encrypted and integrity protected when transferred from the eSIM server 300 to the communication device 200 as part of the network access authentication parameters. Obtaining the operational PSI and credentials then comprises the communication device 200 to derive an encryption key and a message authentication code (MAC) key, and decrypting and verifying the encrypted and integrity protected operational PSI and credentials using these keys.

In some embodiments, the encryption key and MAC key are derived from the private key of the communication device 200 and the public key of the eSIM server 300.

As will be further disclosed below, in some aspects, an ephemeral key pair generated by the provisioning subscription profile (or by the eUICC operating system triggered by the provisioning subscription profile) for the SUCI is used for deriving Ki and OPc. That is in some embodiments, the credentials, the encryption key, and the MAC key are derived using an ephemeral private key generated by the provisioning subscription profile and the public key of the eSIM server 300, and the ephemeral public key corresponding to the ephemeral private key is delivered to the eSIM server 300 as part of the SUCI of the communication device 200.

As will be further disclosed below, in some aspects, the Ki and OPc are different for the provisioning subscription profile and the operational subscription profile. That is, in some embodiments, the values of the credentials for the provisioning subscription profile are different from the values of the credentials for the operational subscription profile.

Figure 3:
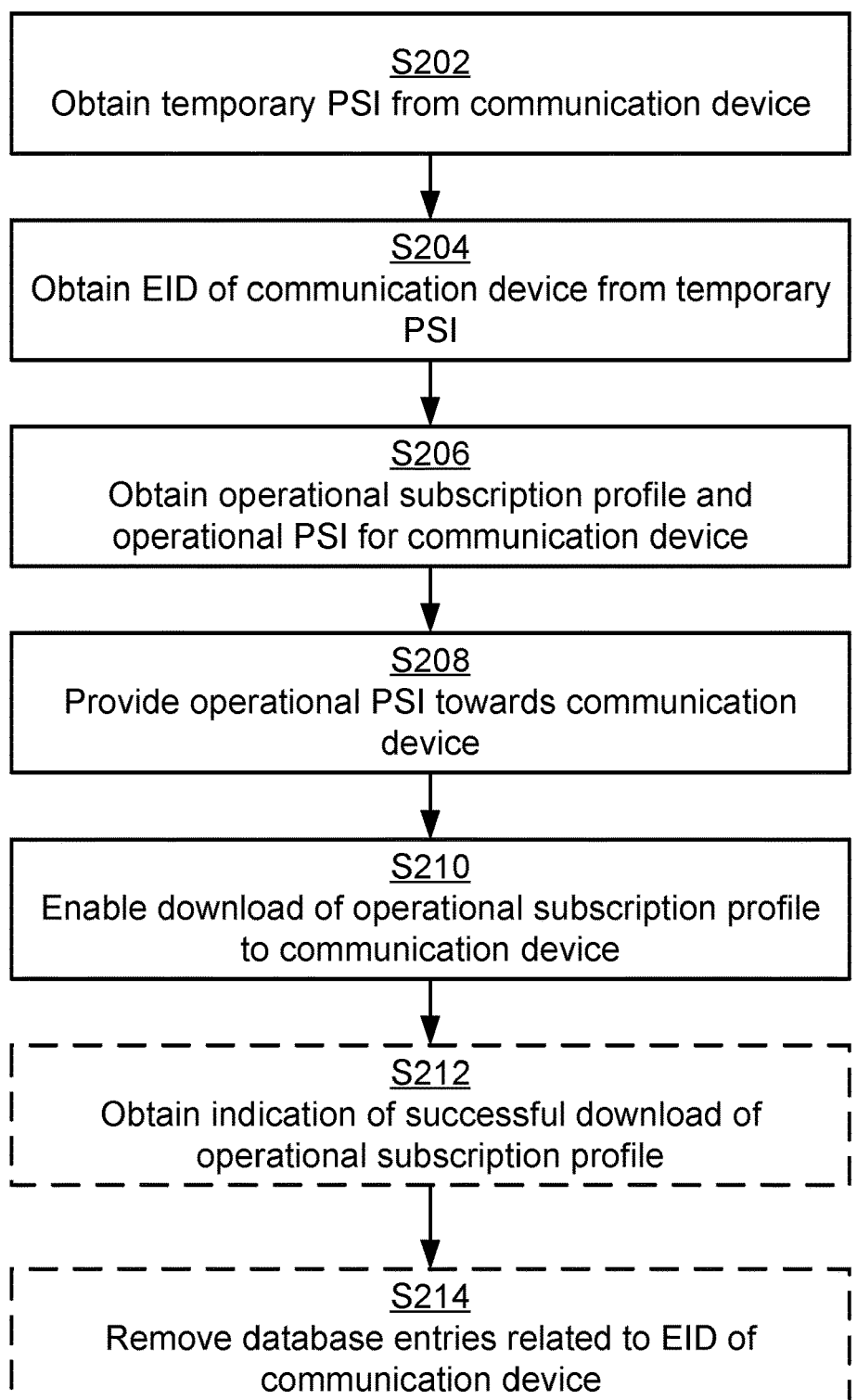

Reference is now made to FIG. 3 illustrating a method for enabling download of an operational subscription profile to the communication device 200 as performed by the eSIM server 300 according to an embodiment. The eSIM server 300 has access to a list of EIDs and information of a temporary PSI for each EID in the list.

S202: The eSIM server 300 obtains, from the communication device 200 using a provisioning subscription profile and having an EID from the list of EIDs, one of the temporary PSIs as part of network attachment being performed between the communication device 200 and a first MNO 130.

S204: The eSIM server 300 obtains, from the temporary PSI, the EID of the communication device 200.

S206: The eSIM server 300 obtains an operational subscription profile and an operational PSI for the communication device 200 based on the EID of the communication device 200.

S208: The eSIM server 300 provides the operational PSI towards the communication device 200 as part of performing network access authentication for the network attachment.

S210: The eSIM server 300 enables download, upon an initial network connectivity having been established for the communication device 200 using the provisioning subscription profile and the operational PSI, of the operational subscription profile to the communication device 200.

Embodiments relating to further details of enabling download of an operational subscription profile to a communication device 200 as performed by the eSIM server 300 will now be disclosed.

As will be further disclosed below, in some aspects, the entry for the EID is removed upon successful download of the operational subscription profile. In particular, in some embodiments, the eSIM server 300 is configured to perform (optional) steps S212 and S214:

S212: The eSIM server 300 obtains an indication of successful download of the operational subscription profile to the communication device 200.

S214: The eSIM server 300, in response thereto, removes database entries related to the EID of the communication device 200.

As will be further disclosed below, in some aspects, the eSIM bootstrap connectivity server 300a obtains the temporary PSI in a roaming request. That is, in some embodiments, the eSIM server 300 comprises an eSIM bootstrap connectivity server 300a, and the temporary PSI is by the eSIM bootstrap connectivity server 300a obtained from the first MNO 130 in a roaming request for the communication device 200.

As will be further disclosed below, in some aspects, the eSIM bootstrap connectivity server 300a serves as home network for the communication device 200. In particular, in some embodiments, the eSIM bootstrap connectivity server 300a serves as home network for the communication device 200 for the network attachment.

As will be further disclosed below, in some aspects, eSIM bootstrap connectivity server 300a determines the EID from the temporary PSI. In particular, in some embodiments, the eSIM bootstrap connectivity server 300a determines the EID of the communication device 200 from the temporary PSI using the list of EIDs and information of the temporary PSI for each EID in the list.

As will be further disclosed below, in some aspects, the operational PSI is encrypted and integrity protected during delivery to the communication device 200. In particular, in some embodiments, the operational PSI is encrypted and integrity protected by the eSIM bootstrap connectivity server 300a before being provided towards the communication device 200, and an encryption key and a MAC key are used for the encryption and the integrity protection.

As will be further disclosed below, in some aspects, the SIM localization server 300b performs localization of the second MNO 140 based on MCC and EID. That is, in some embodiments, the eSIM server 300 comprises an eSIM localization server 300b, and the eSIM localization server 300b performs localization of the communication device 200 using the determined EID.

As will be further disclosed below, in some aspects, collision detection is performed, and as a consequence, re-localization is performed. In particular, in some embodiments, the temporary PSI is a temporary IMSI, and, when the EID obtained from the temporary IMSI matches more than one of the EIDs in the list of EIDs, the list of EIDs is provided from the eSIM bootstrap connectivity server 300a to the eSIM localization server 300b. The eSIM localization server 300b then performs re-localization of the communication device 200 by sequentially using a next EID in the list of EIDs until network access authentication with the communication device 200, for transfer of the operational IMSI, is successful.

In some embodiments, the eSIM server 300 comprises a provisioning server 300c, and the provisioning server 300c prepares the operational subscription profile.

As disclosed above, credentials in terms of a shared secret, Ki, between the communication device 200 and a second MNO 140 and an operator-specific constant, OPc, might be used by the provisioning subscription profile of the communication device 200 as part of network access authentication for establishing the initial network connectivity. In some embodiments, the credentials are provided to the second MNO 140 from the eSIM server 300.

As disclosed above, in some embodiments, the values of the credentials are identical to the values of the credentials for the operational subscription profile.

In some embodiments, the values of the credentials are derived by the eSIM server 300 using a private key of the eSIM server 300 and a public key of the communication device 200.

As disclosed above, in some embodiments, the values of the credentials are independent from properties of the eSIM server 300.

As disclosed above, in some embodiments, the credentials are delivered to the communication device 200 from the eSIM server 300 together with the operational PSI.

In some embodiments, the eSIM server 300 comprises an eSIM bootstrap connectivity server 300a. The credentials might then be encrypted and integrity protected by the eSIM bootstrap connectivity server 300a before being provided towards the communication device 200. An encryption key and a MAC key might be used for the encryption and the integrity protection.

As disclosed above, in some embodiments, the encryption key and MAC key are derived using a private key of the eSIM bootstrap connectivity server 300a and a public key of the communication device 200.

In some embodiments, the credentials are derived by the eSIM server 300 using a private key of the eSIM server 300 and an ephemeral public key generated by the provisioning subscription profile of the communication device 200 and transferred to the eSIM server 300 with the temporary PSI as part of a SUCI.

As disclosed above, in some embodiments, the values of the credentials for use with the provisioning subscription profile are different from the values of the credentials for the operational subscription profile. In these embodiments, the values of Ki and OPc for use with the provisioning subscription profile might be derived using a private key of the eSIM bootstrap connectivity server 300a.

Figure 4:
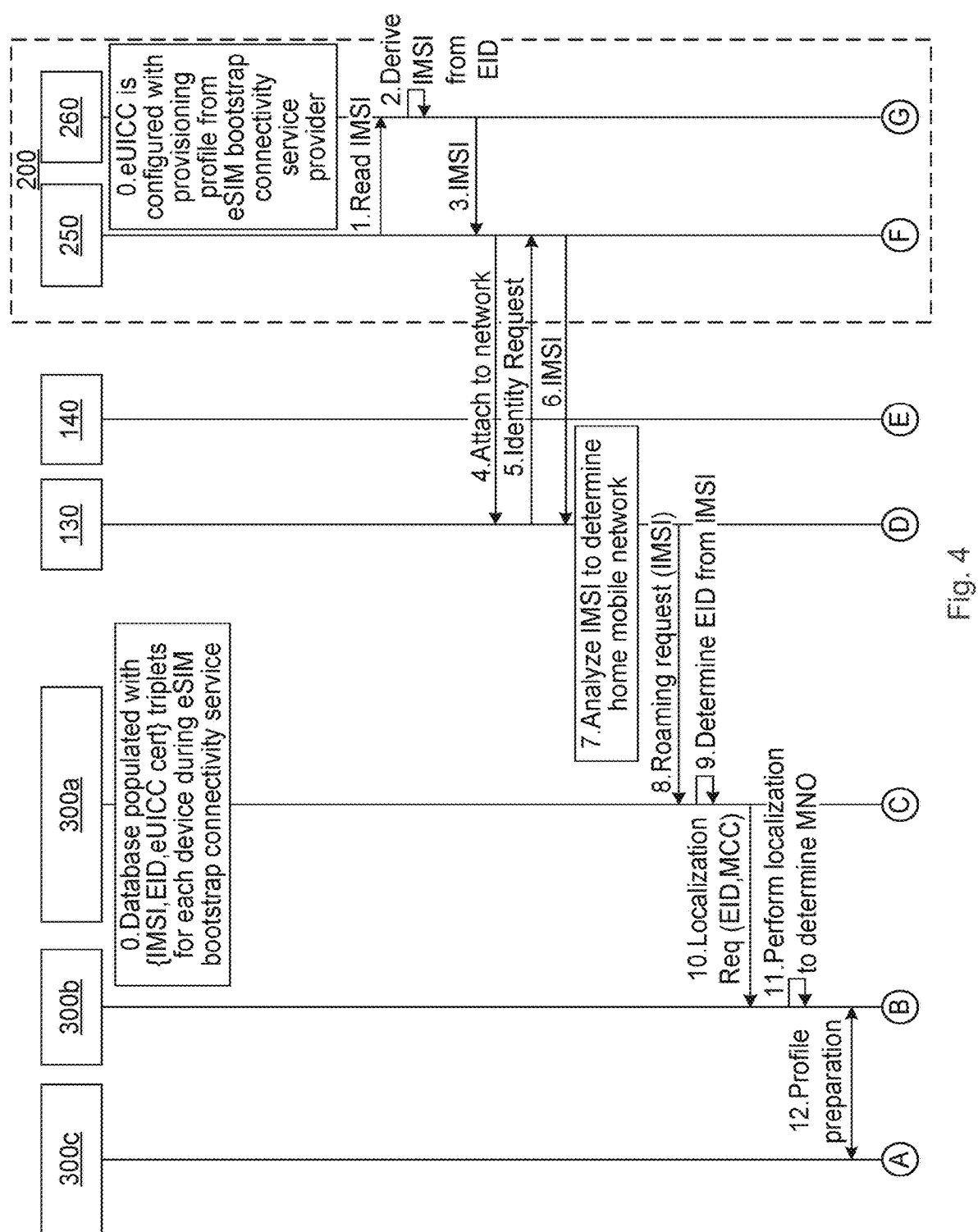
FIGS. 4, 5, 6, 7, and 8 are signalling diagrams according to embodiments.
Figure 4:
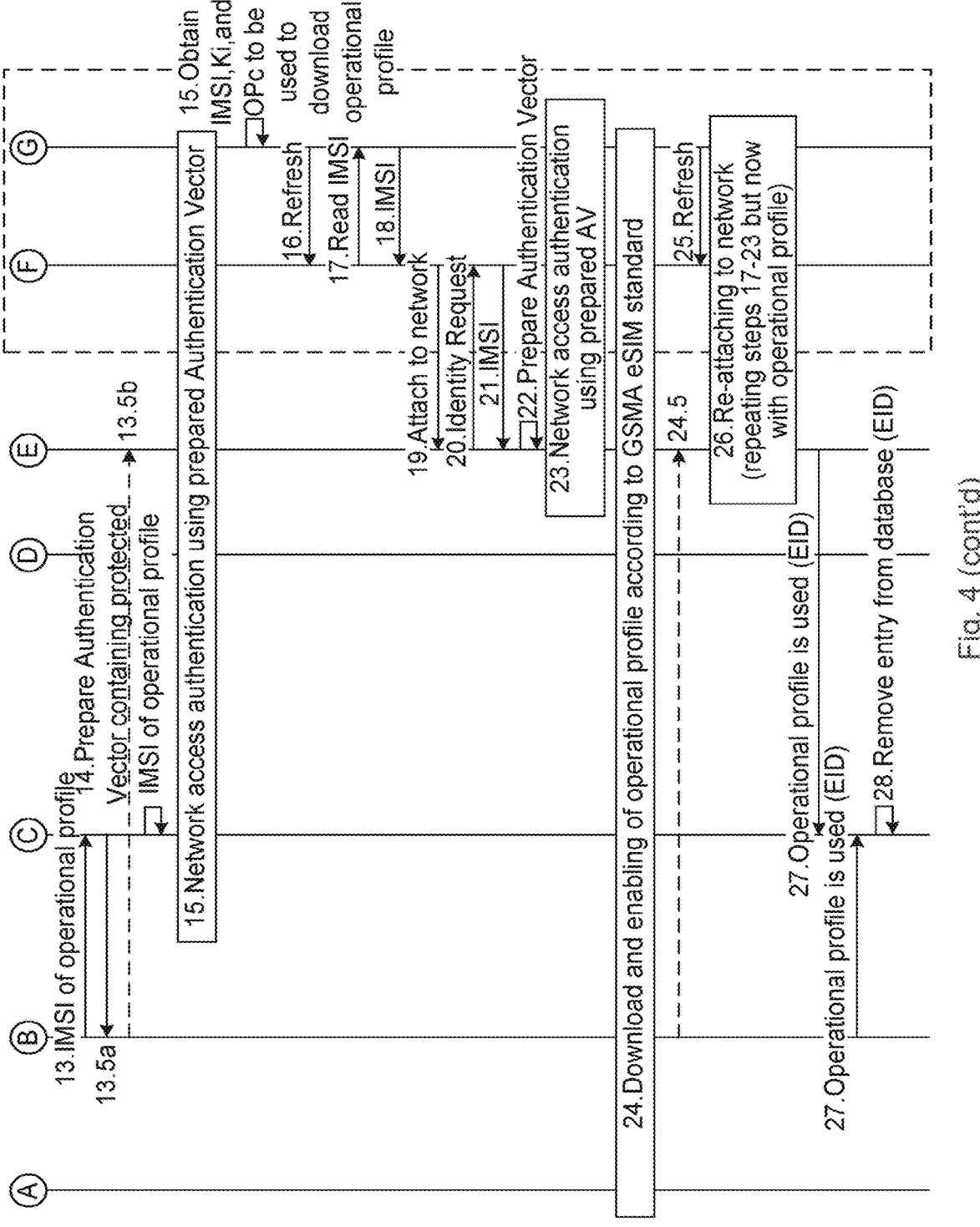

One particular embodiment for the communication device 200 to gain initial connectivity and download the operational subscription profile based on at least some of the above disclosed embodiments will now be disclosed in detail with reference to the signalling diagram of FIG. 4. In FIG. 4, for brevity, the term profile is used instead of the term subscription profile.

Step 0: The database of the eSIM bootstrap connectivity server 300*a* is populated with {IMSI, eUICC certificate, EID} triplets for each communication device 200 using the service of the eSIM bootstrap connectivity server 300*a*. The eUICC of each communication device 200 using the service is configured with a provisioning subscription profile from the eSIM bootstrap connectivity server 300*a*. This subscription profile is the current active subscription profile of the eUICC.

Step 1: In order to attach to a network at first wake-up of the communication device 200, the modem of the communication device 200 reads the IMSI from the eUICC.

Step 2: The provisioning subscription profile of the eUICC derives an IMSI. The MCC+MNC, and possibly a few more digits, are pre-configured in the provisioning subscription profile. The rest of the digits are derived from the EID of the provisioning subscription profile which is obtained by the provisioning subscription profile using an eUICC function. For example, the rest of the digits are assigned as the truncated SHA-256 hash of the EID.

Step 3: The IMSI is obtained by the modem.

Step 4: The modem scans for available networks to attach to. Using MCC+MNC from IMSI, the modem analyzes the available networks and determines the first MNO as a suitable MNO. The modem then requests to attach to the selected network.

Step 5: An identity request is provided from the first MNO.

Step 6: The modem provides the IMSI as a response to the identity request.

Step 7: The first MNO analyzes the IMSI to determine the home mobile network for the communication device 200.

Step 8: The first MNO performs a roaming request to the home network. The home network is either the eSIM bootstrap connectivity server 300*a* acting as an MVNO, or the home network is another MNO (the third MNO in FIG. 1), and where the IMSI range to which the IMSI belongs to is handled by the eSIM bootstrap connectivity server 300*a*. The eSIM bootstrap connectivity server 300*a* then controls the HSS or similar entity.

Step 9: The eSIM bootstrap connectivity server 300*a* uses its database to retrieve the EID matching to the received IMSI. Although in this example it is assumed that there is only one matching entry, several entries in the database may be valid. How frequent such collisions occur depends on the size of the range of IMSIs and how many devices is currently using the service. In the MVNO case the number of possible different IMSIs is 10 billion which makes the probability of collision very small.

Step 10: The eSIM bootstrap connectivity server 300*a* requests localization to be performed. The EID of the eUICC of the communication device and the MCC where the communication device is located are provided as input. The localization is here performed by the eSIM localization server 300*b* but might alternatively be performed by the enterprise owning the communication device. The eSIM bootstrap connectivity server 300*a* does not necessarily interact directly with the entity performing the localization.

Step 11: The localization is performed and an MNO to provide an operational subscription profile is determined, represented by the second MNO.

Step 12: An operational subscription profile from the MNO selected in step 11 need to be prepared/selected. This step may involve selecting a pre-generated operational subscription profile and binding it to the communication device (e.g. bind to the EID) or interaction with a provisioning server 300*c* is performed to prepare an operational subscription profile bound to the EID. Either the profile selection/profile preparation is handled by the eSIM localization server 300*b* on behalf of the second MNO or the eSIM localization server 300*b*/enterprise invokes the second MNO for this operation.

Step 13: The IMSI of the operational subscription profile is returned to the eSIM bootstrap connectivity server 300*a*.

Step 13.5*a*: In the case the values of Ki and OPc to be used together with the operational IMSI by the provisioning subscription profile (during network access authentication when attaching to the second MNO in order to download the operational subscription profile) are temporary values derived by the eSIM bootstrap connectivity server 300*a*, these temporary values are delivered from the eSIM bootstrap connectivity server 300*a* to the eSIM localization server 300*b*.

Step 13.5*b*: The eSIM localization server 300*b* triggers an update of the HSS of the second MNO with the IMSI of operational profile, Ki, and OPc.

Step 14: An authentication vector (AV) is prepared for the communication device. The AV contains the IMSI of the operational subscription profile.

Step 15: Network access authentication is performed using the AV and following the AKA procedure based on the cellular technology being used. The provisioning subscription profile of the eUICC and HSS of the eSIM bootstrap connectivity server 300*a* here has a modified behavior according to the below but this behavior is transparent to the visiting network (i.e., the first MNO) and data and message formats follows the used cellular standard. As part of network access authentication, the provisioning subscription profile of the eUICC obtains the IMSI of the operational subscription profile from the AV. It also obtains/derives the Ki and OPc values to be used together with the received IMSI by the provisioning subscription profile during network access authentication when attaching to the second MNO (to download the operational subscription profile). The provisioning subscription profile stores IMSI, Ki, and OPc as the new values to be used by the provisioning subscription profile in future network access authentication.

Step 16: The provisioning subscription profile uses the refresh command to trigger the modem to detach from the current network and drop all cached information related to that network.

Step 17: The modem request reading of the operational IMSI from the active profile, i.e., the provisioning subscription profile, at the eUICC.

Step 18: The operational IMSI is obtained by the modem from the eUICC.

Step 19: The modem scans for available networks to attach to and selects the network (represented by the second MNO) given by the MCC+MNC from the operational IMSI. The modem then requests to attach to the selected network.

Step 20: An identity request is provided from the second MNO.

Step 21: The modem provides the operational IMSI as a response.

Step 22: An authentication vector (AV) is prepared for the communication device.

Step 23: Network access authentication is performed using the AV and following the cellular technology being used.

Step 24: Once the communication device has received initial connectivity the communication device downloads the operational subscription profile from the provisioning server 300c. The interactions to download the operational subscription profile follows the eSIM standard (M2M or consumer variant). Once the operational subscription profile is downloaded it is made active instead of the provisioning subscription profile.

Step 24.5: Upon notification of successful operational profile download and activation, and in the case temporary values for Ki and OPc were used by the provisioning subscription profile, the eSIM localization server 300b triggers an update of the HSS of the second MNO with the IMSI, Ki, and OPc of the operational profile, whereby the temporary Ki and OPc are updated to the operational Ki and OPc.

Step 25: The refresh command is used (or alternatively this is triggered from a device component involved in the profile switch) which triggers the modem to detach from the current network and drop all cached information related to the network.

Step 26: The modem re-attaches to the second MNO by repeating steps 17-23 but now with the operational subscription profile. Upon successful network attachment the communication device is now ready to starts its operational task, e.g. report sensor data.

Step 27: The second MNO provides a notification towards the eSIM bootstrap connectivity server 300a. According to the notification, the operational subscription profile has been downloaded and is now successfully in use. The eSIM bootstrap connectivity server 300a might obtain the notification directly from the second MNO or be delivered from the second MNO via the eSIM localization server 300b or via the enterprise to the eSIM bootstrap connectivity server 300a.

Step 28: In order to avoid collisions, the number of active communication devices for bootstrap in the eSIM bootstrap service database should be kept as small as possible. As soon as the eSIM localization server 300b has been used by the communication device 200, the eSIM bootstrap connectivity server 300a removes the database entry for the eUICC with the EID of the communication device 200.

The details of steps 14 and 15, i.e. how the operational IMSI of the operational subscription profile is downloaded to the provisioning subscription profile of the eUICC and how the Ki and OPc values are obtained/derived that are to be used together with this IMSI by the provisioning subscription profile during network access authentication, will be described in further detail below.

As noted above, the operational IMSI will be used by the provisioning subscription profile during network access authentication to get initial connectivity via the network associated with the operational subscription profile, but prior to the operational subscription profile has been downloaded.

The operational IMSI is downloaded as part of the authentication vector prepared by the eSIM bootstrap connectivity server 300a in step 14 of FIG. 4 and downloaded to the eUICC in step 15. For privacy reason, and to avoid any modification of the operational IMSI on the way, the operational IMSI is both encrypted and integrity protected during the delivery. The keys used for encryption and integrity protection are derived from a shared secret between the provisioning subscription profile and the eSIM bootstrap connectivity server 300a. Preferably, the shared secret is the Elliptic-curve Diffie-Hellman (ECDH) shared secret derived from the private-public key pair of the eUICC for use with eSIM and the private-public key pair of the eSIM bootstrap connectivity server 300a. The HSS of the eSIM bootstrap connectivity server 300a stores the private key of the eSIM bootstrap connectivity server 300a and obtains the eUICC public key needed to compute the shared secret from the eUICC certificate corresponding to the EID determined in step 9 of FIG. 4 and that is stored in its database. The provisioning subscription profile stores the public key of the eSIM bootstrap connectivity server 300a and uses eUICC functions to derive the shared secret, where the private key of the eUICC and the stored public key are used. Alternatively, as a less secure option, the provisioning subscription profile may contain a global secret from which a shared secret specific for the eUICC can be derived using the EID. The corresponding global secret is then also available to the eSIM bootstrap connectivity server 300a for use in derivations.

In order to make the encryption key and MAC key session dependent, those keys are derived from the shared secret (ECDH or derived from the global secret) and a seed. Here as a seed, the random value/challenge delivered as the RAND value as part of the Authentication Vector might be used. The RAND may also be concatenated with a string e.g. "NAA" used to separate key derivations for different purpose, as will be further disclosed below. The ANSI-X9.63-KDF algorithm may for example be used for the key derivation. The encryption algorithm and MAC-algorithm used for the encryption and integrity protection of IMSI may for example be the AES and HMAC-SHA-256 algorithms, respectively. The MAC algorithm may instead be the Milenage f1 function, where the operational IMSI and flags (described below) replace the SQN and AMF field given as input.

Figure 5:
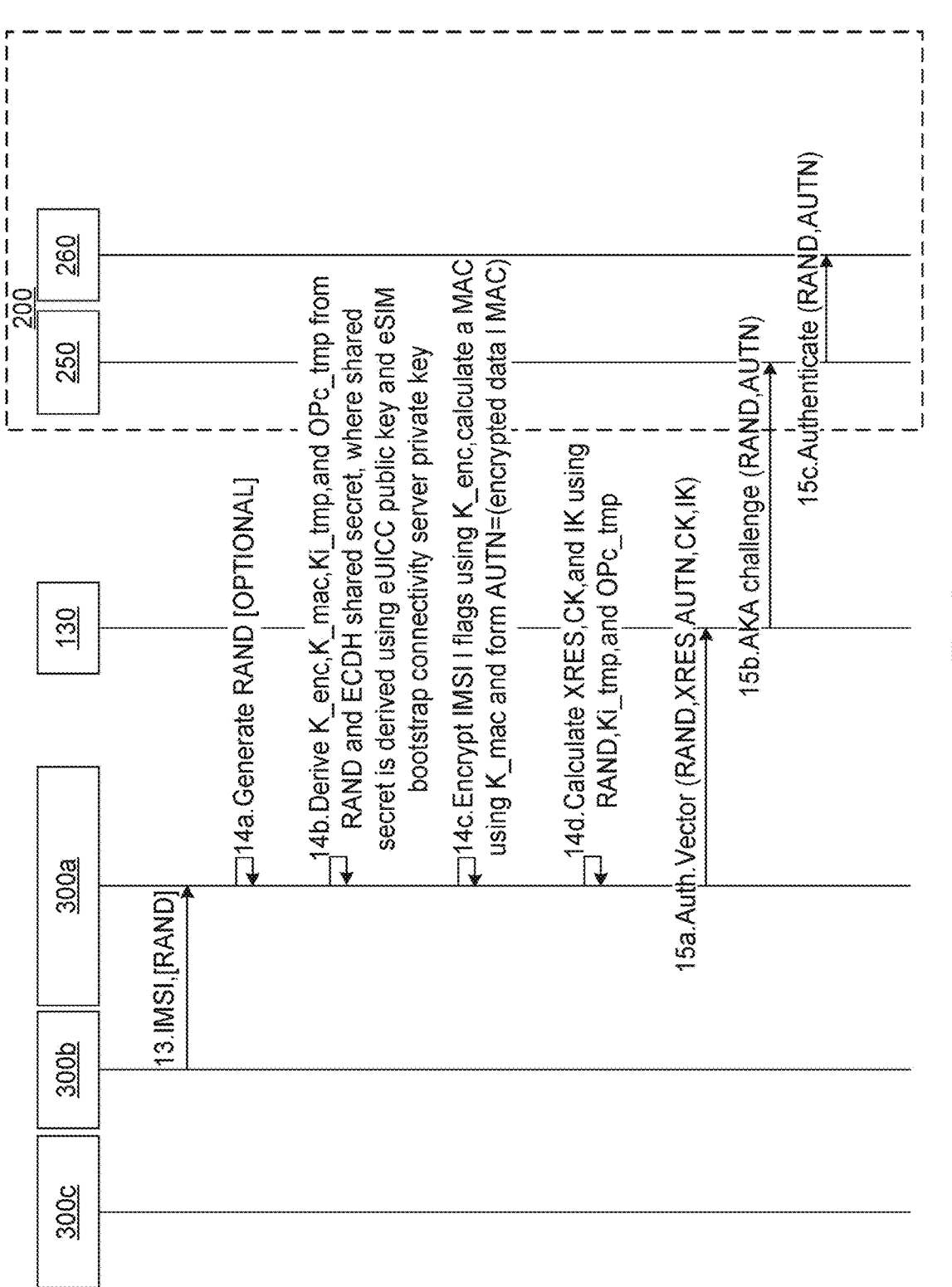
Figure 5:
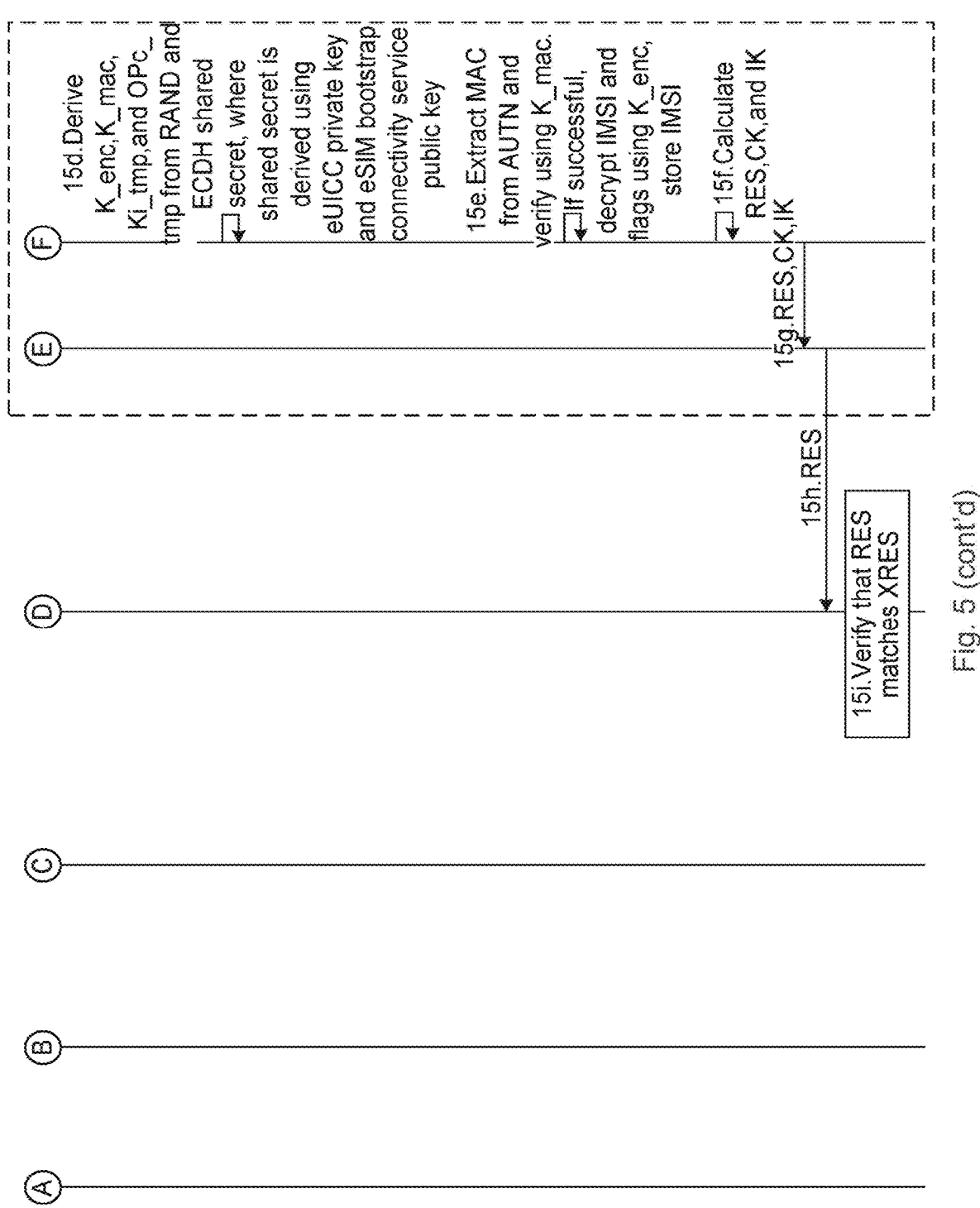

One particular embodiment for how the IMSI of the operational subscription profile is downloaded to the provisioning subscription profile of the eUICC based on at least some of the above disclosed embodiments will now be disclosed in detail with reference to the signalling diagram of FIG. 5.

FIG. 5 describes steps 13-15 of FIG. 4 in more detail.

Step 13: The operational IMSI is provided to the eSIM bootstrap connectivity server 300a. As an option, a random value used as RAND and used in the key derivation as described above may also be provided. This option is described in more detail below.

Step 14: The authentication vector is generated.

a. The HSS of the eSIM bootstrap connectivity server 300a generates a random value RAND for use in the authentication. Alternatively, this RAND is obtained in step 13.

b. The cSIM bootstrap connectivity server 300a uses the RAND and the shared secret (ECDH or the one derived from global secret) according to the above description to derive encryption key K_enc and K_mac. In addition, temporary values for Ki and OPc denoted Ki_tmp and OPc_tmp are derived (using same key derivation) for use in the network access authentication.

c. The concatenation of IMSI and a flag field further described below is encrypted using K_enc and integrity protected by computing a MAC using K_mac over the encrypted data. The concatenation of the encrypted data and the MAC forms the Authentication Key (AUTN) value of the authentication vector.

d. The XRES, CK, and IK values are computed according to ordinary network access authentication algorithms (e.g. Milenage) using RAND, Ki_tmp, and OPc_tmp as input.

Step 14: Network access authentication is performed.

a. The authentication vector (RAND, AUTN, XRES, CK, IK) is delivered from the eSIM bootstrap connectivity server 300a to the visiting mobile network (i.e., the first MNO).

b. The visiting network sends RAND and AUTN as an authentication challenge to the modem of the communication device.

c. The modem invokes the Authenticate command of the eUICC, where RAND and AUTN are provided.

d. The provisioning subscription profile derives the shared secret according to the above and derives K_enc, Ki_tmp, and OPc_tmp according to the description.

e. The provisioning subscription profile extracts the MAC from AUTN and verifies the MAC using K_mac. If the MAC is successfully verified, the encrypted data of AUTN is extracted and decrypted to obtain the operational IMSI and the flag field.

f. The provisioning subscription profile computes RES, CK, and IK according to ordinary network access authentication algorithms (e.g. Milenage) using RAND, Ki_tmp, and OPc_tmp as input.

g. The RES, CK, and IK are provided as a response to the Authenticate command.

h. The modem returns the RES to the visiting network as a response to the authentication challenge.

i. The visiting network verifies that RES equals XRES and if this is the case authentication was successful.

The MAC verification in step 15e may fail due to different reasons. One reason is that there is a collision of IMSIs (this should happen very rarely), i.e. in the eSIM bootstrap connectivity server 300a database there is at least one more EID that has the same IMSI as derived for this eUICC and the HSS of the eSIM bootstrap connectivity server 300a selected the wrong entry in the database (i.e., the wrong EID). This means that the shared secret is not correctly derived and that MAC verification will fail. The provisioning subscription profile then needs to send its EID to the eSIM bootstrap connectivity server 300a. Another reason for MAC failure is that the AUTN value was somehow modified during transfer. The provisioning server 300b cannot distinguish between these two cases and the EID will therefore always be provided in case of MAC failure.

The eSIM bootstrap connectivity server 300a will know when there is an IMSI collision and there is a risk that the wrong EID is selected. In case of IMSI collision there are more than one entry in the database of the eSIM bootstrap connectivity server 300a matching the IMSI in step 9 of FIG. 4. The localization procedure may help in selecting the correct EID (i.e. the correct database entry). The localization rules may be such that a given EID range belongs to communication devices from a certain enterprise for which a certain set of countries are valid for where the communication device may show up based on pre-negotiated MNO contracts. As an example, a communication device connects via a visiting network in Brazil and there are two possible EIDs deduced from the IMSI. However, according to the localization rules only one of the EIDs is in an EID range from an enterprise where localization is possible to an MNO in Brazil, which means this EID shall be selected.

Depending on the relation between the eSIM bootstrap connectivity server 300a and eSIM localization server 300b, the localization may be leveraged in the choice of EID. One such an embodiment, and where a collision occurs, based on at least some of the above disclosed embodiments will now be disclosed in detail with reference to the signalling diagram of FIG. 6.

Figure 6:
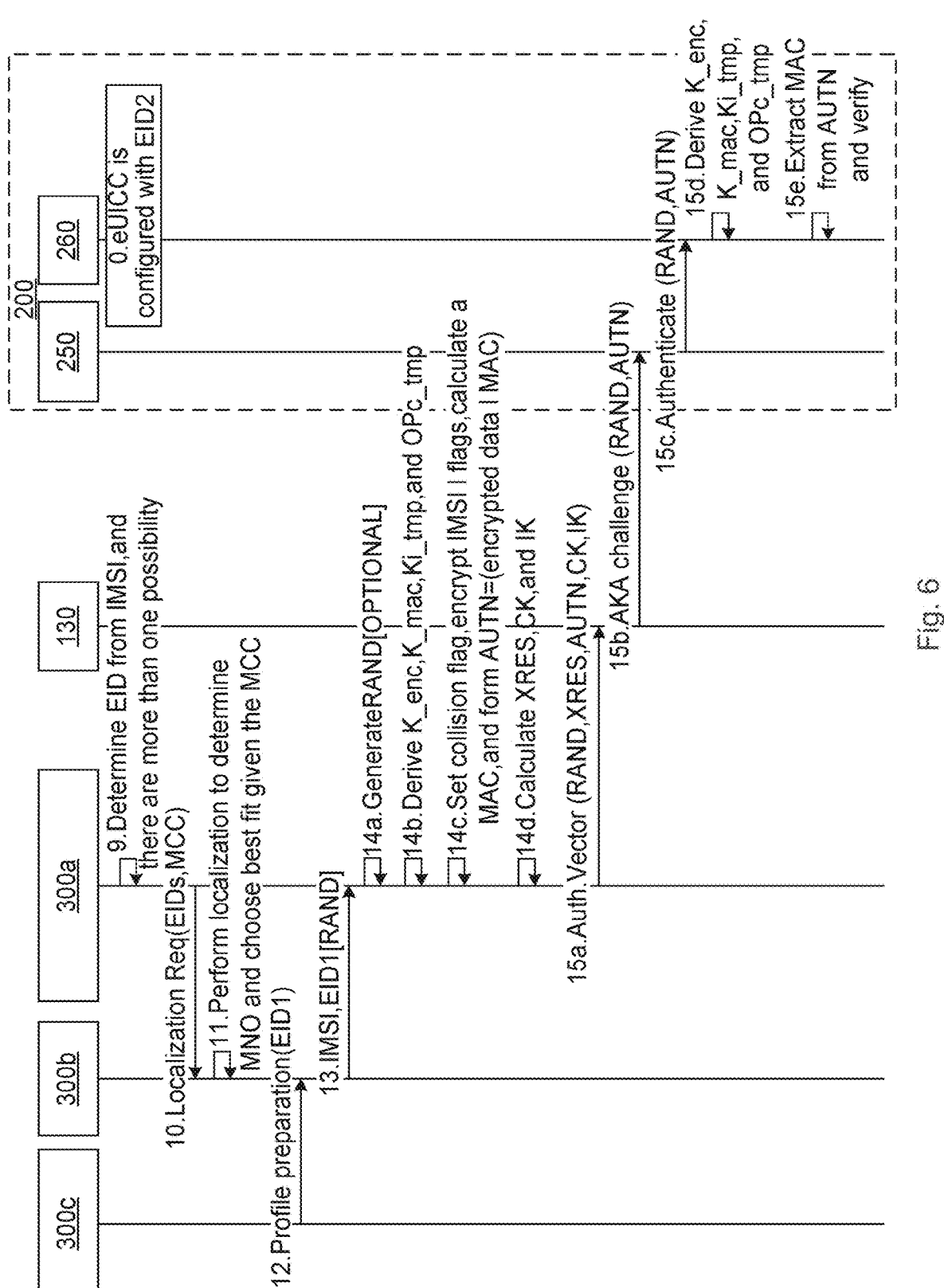
Figure 6:
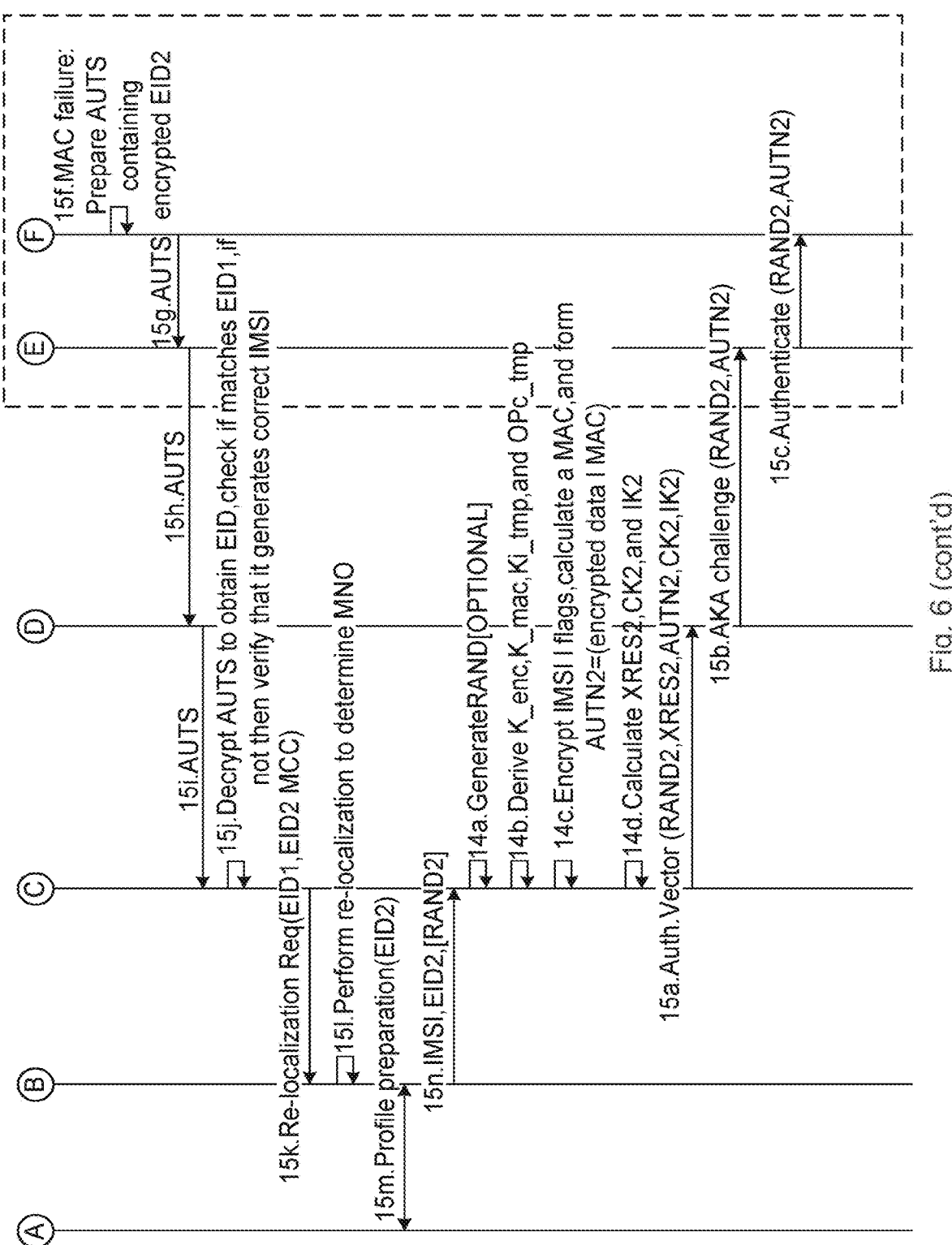
Figure 6:
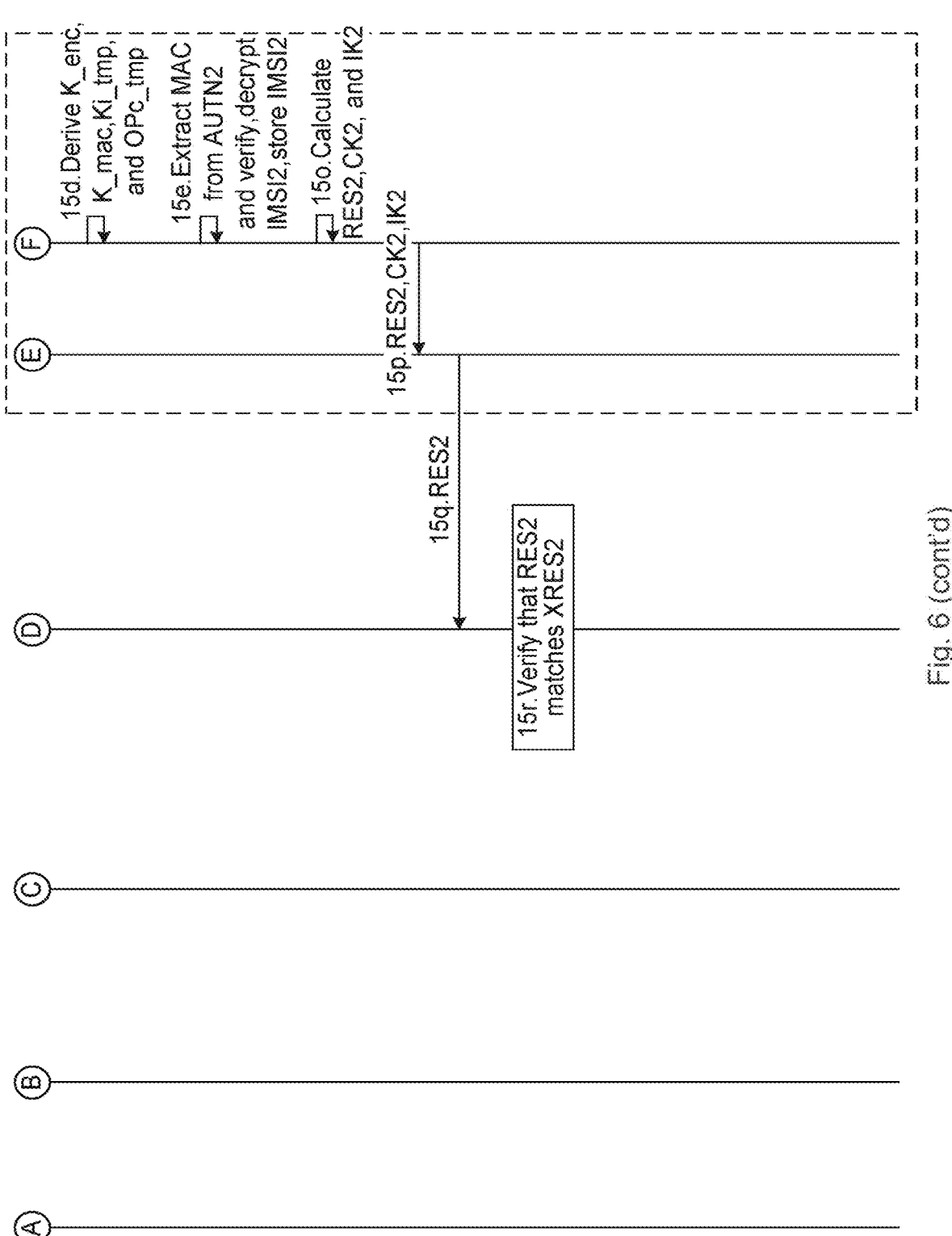

FIG. 6 describes steps 9-15 of FIG. 4 in more detail.

Step 9: The eSIM bootstrap connectivity server 300a discovers already in step 9 that there are more than one entry in its database (i.e., more than one EID) matching the received IMSI.

Step 10: The full list of possible EIDs is provided to the eSIM localization server 300b for localization together with the country (i.e., the MCC value of the first MNO) where the communication device is currently connecting.

Step 11: The localization is performed and a first EID, EID1, from the provided list is selected and the MNO to provide an operational subscription profile is determined. In this example, EID1 is not the correct EID since the request came from a communication device with an eUICC with a second EID, EID2.

Step 12: An operational subscription profile is prepared/selected as described in step 12 of FIG. 4.

Step 13: Besides IMSI and possible RAND as provided in step 13 of FIG. 5, the selected EID is here also provided, which in this case is EID1.

Step 14: An authentication vector is generated as shown in step 14 of FIG. 5 using data mapping to EID1.

Step 15: Network access authentication is performed. Steps 15a-15d follows those of FIG. 5.

e. The MAC verification fails since the eUICC is not the one matching the EID selected in step 11.

f. Due to MAC failure, the EID (i.e. EID2) is encrypted using K_enc and the encrypted data is formatted into an AUTS message.

g. The eUICC signals synchronization error and provides AUTS as a response to the request in step 15c.

h. The modem responds with synchronization error to the visiting network and provides the AUTS.

i. The visiting network responds with synchronization error to the eSIM bootstrap connectivity server 300a and provides the AUTS.

j. The eSIM bootstrap connectivity server 300a first tries to decrypt the AUTS with K_enc derived in step 14b but the retrieved result is not matching EID1. It then goes through the list of database entries with IMSI matching the one in step 9, derives keys according to step 14b of FIG. 5 and decrypts the encrypted data of AUTS. This is repeated until the decrypted data is an EID that matches the EID of the current database entry, which means the correct EID is found. In this case the correct EID is EID2.

k. A re-localization is requested from the eSIM localization server 300b. Both EID1 and EID2 are provided and the MCC from the IMSI.

l. The localization is performed for EID2 and the second MNO to provide an operational subscription profile is determined. Note that EID1 is not the correct one since the request came from a device with eUICC with EID2.

m. An operational subscription profile is prepared/selected for EID2 as described in step 12 of FIG. 4. The operational subscription profile associated with EID1 should also be disassociated from EID1.

n. The operational IMSI of the new operational subscription profile (here denoted IMSI2), EID2, and possible RAND, are provided back to the eSIM bootstrap connectivity server 300a.

The rest of the steps in FIG. 6 is a repetition of steps 14 and 15 in FIG. 5 but with the data associated with EID2 and with IMSI2 to be provided to the provisioning subscription profile.

When more than one possible EID is matching the IMSI as in step 9 and a selection of one EID needs to be performed, could be desirable to avoid updating the HSS of the second MNO with subscription data that later on turns out to be incorrect. The eSIM bootstrap connectivity server 300a does not get immediate feedback in case the correct EID was selected. In order to provide such immediate feedback, the eUICC might always returns the EID when more than one possible EID is matching the IMSI as in step 9. In this way the eSIM bootstrap connectivity server 300a can wait and update the second MNO until it is sure that correct EID was selected. One such particular embodiment based on at least some of the above disclosed embodiments will now be disclosed in detail with reference to the signalling diagram of FIG. 7.

Figure 7:
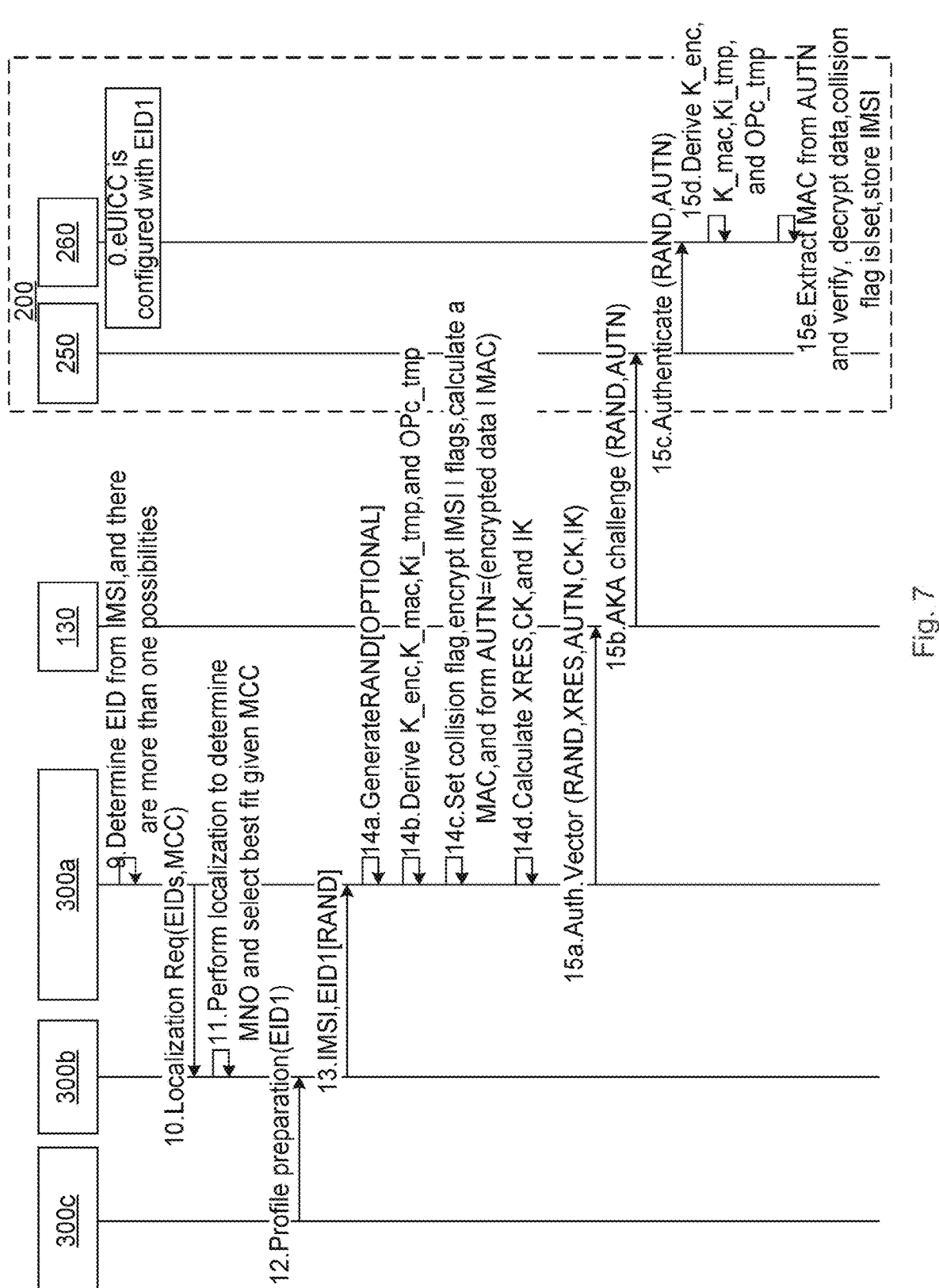
Figure 7:
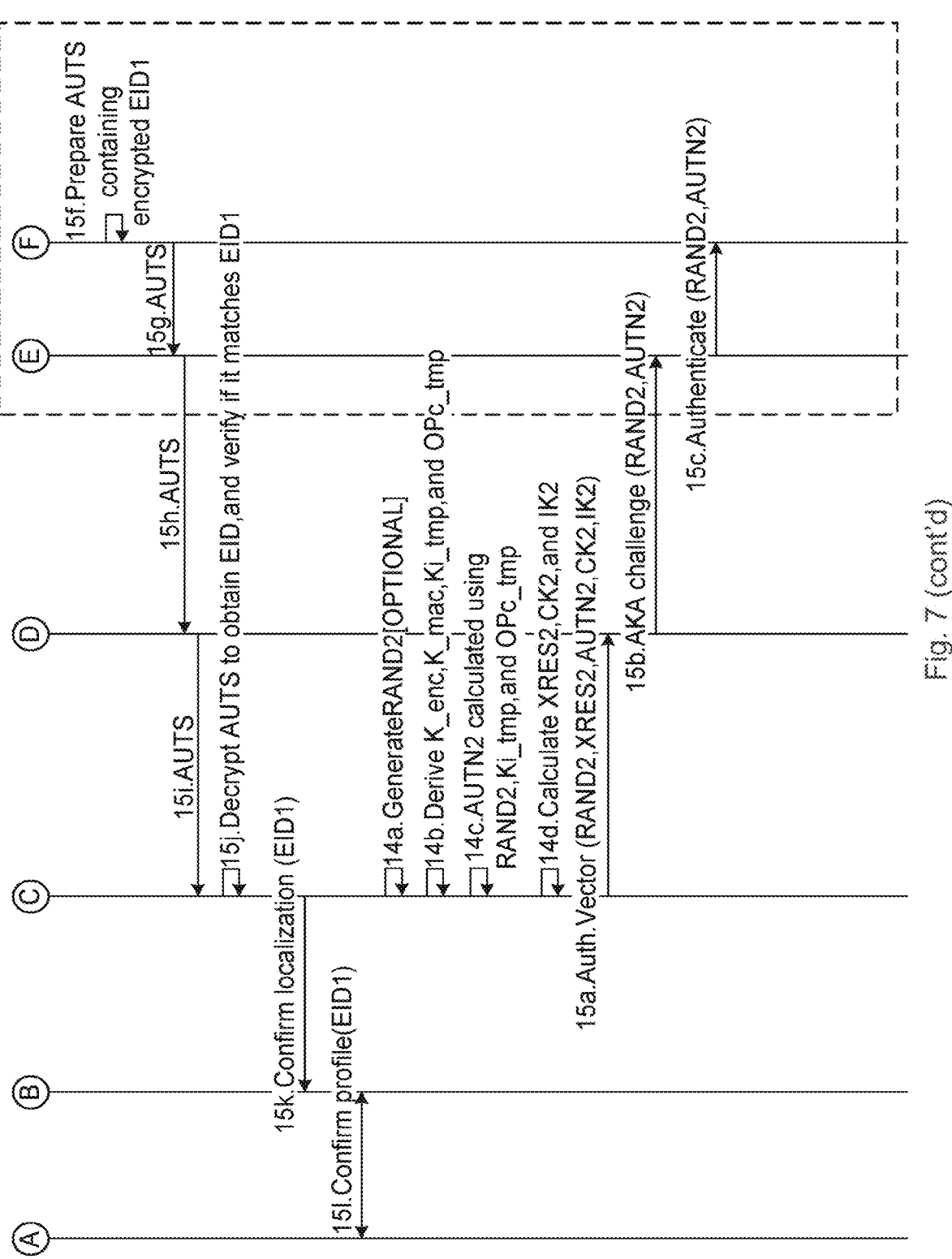
Figure 7:
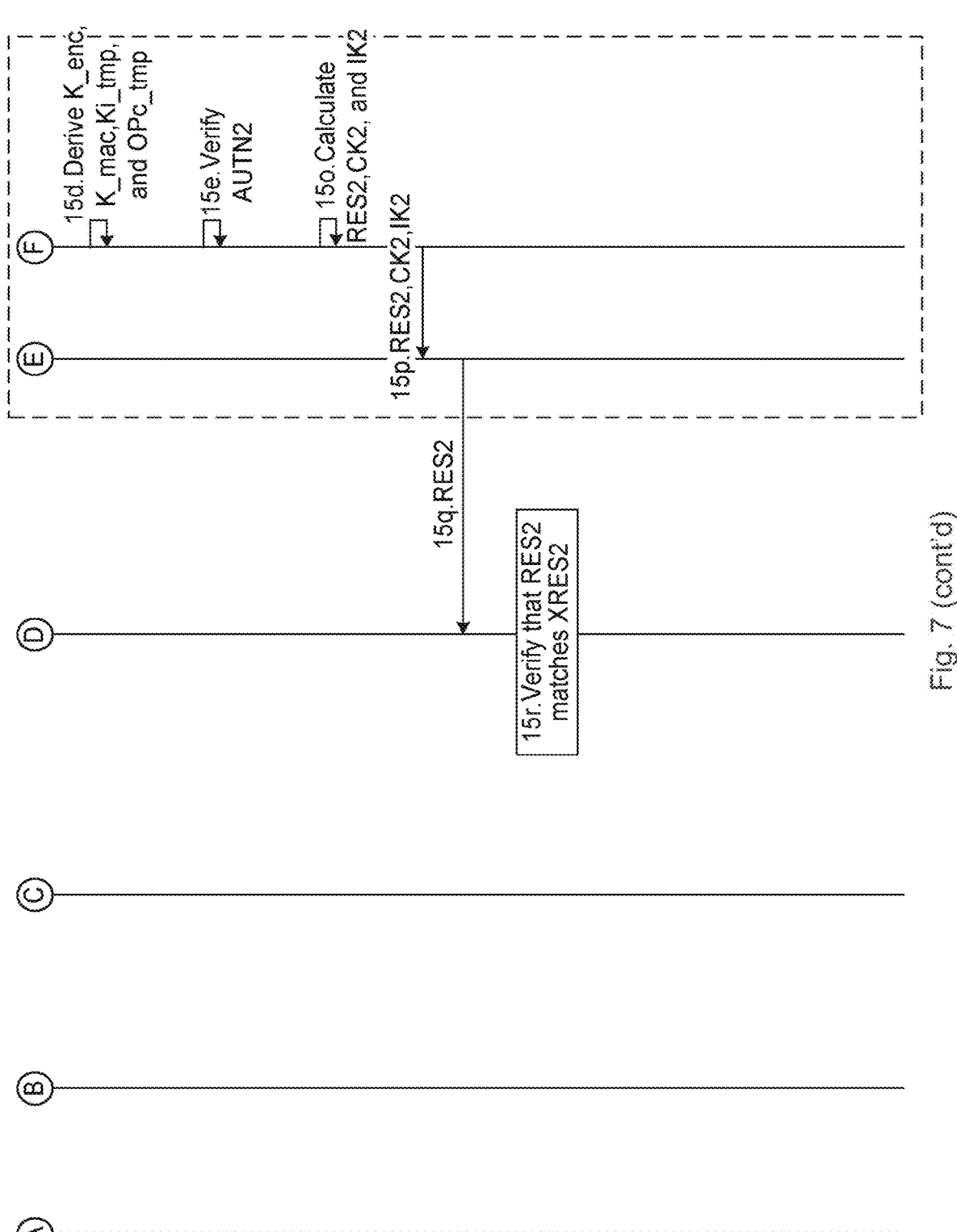

The steps of FIG. 7 are identical to those of FIG. 6 with the following differences:

The collision flag is set in step 14c indicating to the communication device that it should respond with EID even if the integrity of the received IMSI and flags is successful.

The MAC verification in step 15e is successful and it is discovered that the collision flag is set, which triggers the provisioning subscription profile to prepare an AUTS with the encrypted EID as in step 15f.

In step 15j the AUTS is successfully decrypted using K_enc of step 14b such that EID1 is obtained and the eSIM bootstrap connectivity server 300a knows that the correct EID was selected. This is confirmed to the eSIM localization server 300b and provisioning server in steps 15k and 15l.

Upon conclusion that the EID was selected, a new authentication vector is following step 14 but since the correct IMSI was already delivered the AUTN2 is now derived (in the second occurring step 14c) following ordinary network access authentication algorithms (e.g. Milenage) using RAND2, Ki_tmp, and OPc_tmp as input.

The second authentication vector is verified by the provisioning subscription profile with the difference that the AUTN2 is verified using the ordinary network access authentication algorithms.

In 5G AKA (and Extensible Authentication Protocol (EAP) AKA' used in 5G) the RES computed by the eUICC is sent back to the home network (AUSF) for verification against XRES. This means that (in case of collisions) immediate feedback is provided that the selected EID is the correct one, without having to perform the full flow of FIG. 7. In this case, upon successful verification of the MAC in step 15e (first occurrence of step 15e), the provisioning subscription profile computes RES, CK, and IK, where the RES is provided back to the eSIM bootstrap connectivity server 300a via the visiting network for verification against XRES. Upon successful verification, steps 15k and 15l may be performed.

The IMSI and the EID are represented by 15 digits and 32 digits, respectively. To encode the IMSI and the EID one possibility is to group 3 digits together and encode them as a number between 0-999 represented by 10 bits. A 15-digit IMSI can then be represented by 50 bits. A 32-digit EID can then be represented by 110 digits, but since the 2 last digits of the EID are check digits, 30-digits (100 bits) is enough. This also assumes a flags field of two bits. The size of the AUTN parameter is 128 bits and the size of the AUTS parameter is 112 bits. The encryption may for example be performed as follows using the AES encryption algorithm.

The encrypted data is obtained by first encrypting a string (e.g. "AUTN" for IMSI or "AUTS" for EID) using K_enc, truncate the result to the size of the data to be encrypted, and then XOR:ing the truncated result to the data to be encrypted. That is:

E(IMSI|flags)=(IMSI|flags) XOR E("AUTN"); trunc, size is 52 bits

E(EID)=EID XOR E("AUTS"); trunc, size is 100

The MAC part of the AUTN may be represented by 64 bits, for example, based on HMAC-SHA-256 using K_mac and truncated to 64 bits. As an example, the full 128-bit AUTN could then be 52-bit encrypted IMSI+flags followed by 12 random bits and then followed by the 64-bit MAC. The 112-bit AUTS is the encrypted EID of 100 bits followed by 12 random bits.

Three different embodiments for establishment of credentials Ki and OPc used by the provisioning subscription profile will now be disclosed. Some aspects of these embodiments have already been disclosed above with reference to the methods performed by the communication device 200 and the eSIM server 300, respectively.

In a first embodiment, the Ki and OPc values of the operational subscription profile are used also by the provisioning subscription profile. This is achieved by the provisioning server 300c by selecting the values when creating the operational subscription profile in such a way that they can be derived by the provisioning subscription profile. For example, the provisioning server 300c might derive an ECDH shared secret using its EC private key and the public key of the eUICC obtained from the eUICC certificate which may be provided to the provisioning server 300c via steps 10 and 12 of FIG. 4. The provisioning server 300c then generates a 128-bit random value, denoted RAND. The Ki and OPc values are then derived from the ECDH shared secret using RAND as a seed. The same key derivation mechanism as described above may be used. The provisioning server 300c assigns the Ki and OPc values to the operational subscription profile when the profile. The RAND is given to the eSIM bootstrap connectivity server 300a in step 13 of FIG. 5 and used in the network access authentication. The same keys can then be derived by the provisioning subscription profile. The provisioning subscription profile includes the public key of the provisioning server and can derive the ECDH shared secret using that public key and the eUICC private key. The RAND is received as part of the authentication vector. It is possible that the RAND is generated by the eSIM bootstrap connectivity server 300a and provided in step 10 of FIG. 4.

In this embodiment the eSIM bootstrap connectivity server 300a is typically part of an eSIM localization server 300b where the selection of Ki and OPc can be influenced and where there is also a dedicated provisioning server 300c used. In case of more than one provisioning server 300c, the public key of each of them must be stored in the provisioning subscription profile. The spare bits of the AUTN that are not used for the encrypted IMSI and flags could be used to select the correct key to use. It is also possible that it is the eSIM bootstrap connectivity server 300a that generates the Ki and OPc values using its private-public key pair and provides these values to the provisioning server 300c. In this case also more than one provisioning server 300c may be used without having to include public keys of every provisioning server 300c into the provisioning subscription profile.

In a second embodiment, it is assumed the values of the Ki and OPc of the operational subscription profile cannot be influenced by the eSIM bootstrap connectivity server 300a.

Temporary Ki and OPc values are used by the provisioning subscription profile until the operational subscription profile has been successfully downloaded and activated. The eSIM bootstrap connectivity server 300*a* derives and provides (possibly via the eSIM localization server 300*b*) the temporary credentials to the HSS of the MNO of the operational subscription profile (i.e., of the second MNO) and the provisioning subscription profile can derive the same values. When the communication device has downloaded the operational subscription profile and switched to the operational subscription profile, where the permanent Ki and OPc values are used, it is necessary for the HSS to switch from using the temporary Ki and OPc to the permanent Ki and OPc generated by the provisioning server 300*c*. The HSS updates to the permanent credentials of the operational subscription profile upon notification received from the provisioning server 300*c* or the eSIM localization server 300*b* that the operational subscription profile was successfully installed and activated. Such notification, or trigger to update the HSS, may contain the values of the permanent credentials. In this embodiment, it is not required that the eSIM bootstrap connectivity server 300*a* is linked to the eSIM localization server 300*b* or the provisioning server 300*c*.

The temporary Ki and OPc values are derived from the ECDH shared secret derived using the eSIM private-public key pair of the eUICC and the private-public key pair of the eSIM bootstrap connectivity server 300*a* in the same way as was described above. For example, the derivation may include RAND obtained from the network access authentication as above and the seed may also involve a string e.g. "temporary" such that the keys for network access authentication and the Ki and OPc values are separated. The provisioning subscription profile contains the public key of the eSIM bootstrap connectivity server 300*a*.

In this embodiment, the switching from the provisioning subscription profile to the operational subscription profile becomes critical since the HSS also needs to switch keys. To limit errors, the communication device should wait so that a response, or notification, is delivered from the communication device that the operational subscription profile was activated before triggering a re-attachment of the network. The communication device might wait a suitable amount of time before re-attaching. In case of errors the communication device should revert back to using the provisioning subscription profile and the HSS should revert back to temporary credentials, and a new attempt in enabling should be performed.

In a third embodiment, the Ki and OPc values of the operational subscription profile are used also by the provisioning subscription profile as in the first embodiment. However, as in the second embodiment, the values of the Ki and OPc of the operational subscription profile cannot be influenced by the eSIM bootstrap connectivity server 300*a*. The Ki and OPc values of the operational subscription profile, e.g. a pre-generated operational subscription profile, are obtained by the eSIM bootstrap connectivity server 300*a* from the second MNO or the provisioning server 300*c* typically as being part of eSIM localization server 300*b* (and where the eSIM localization server 300*b* may even have the responsibility for managing the HSS for the MNO).

Figure 8:
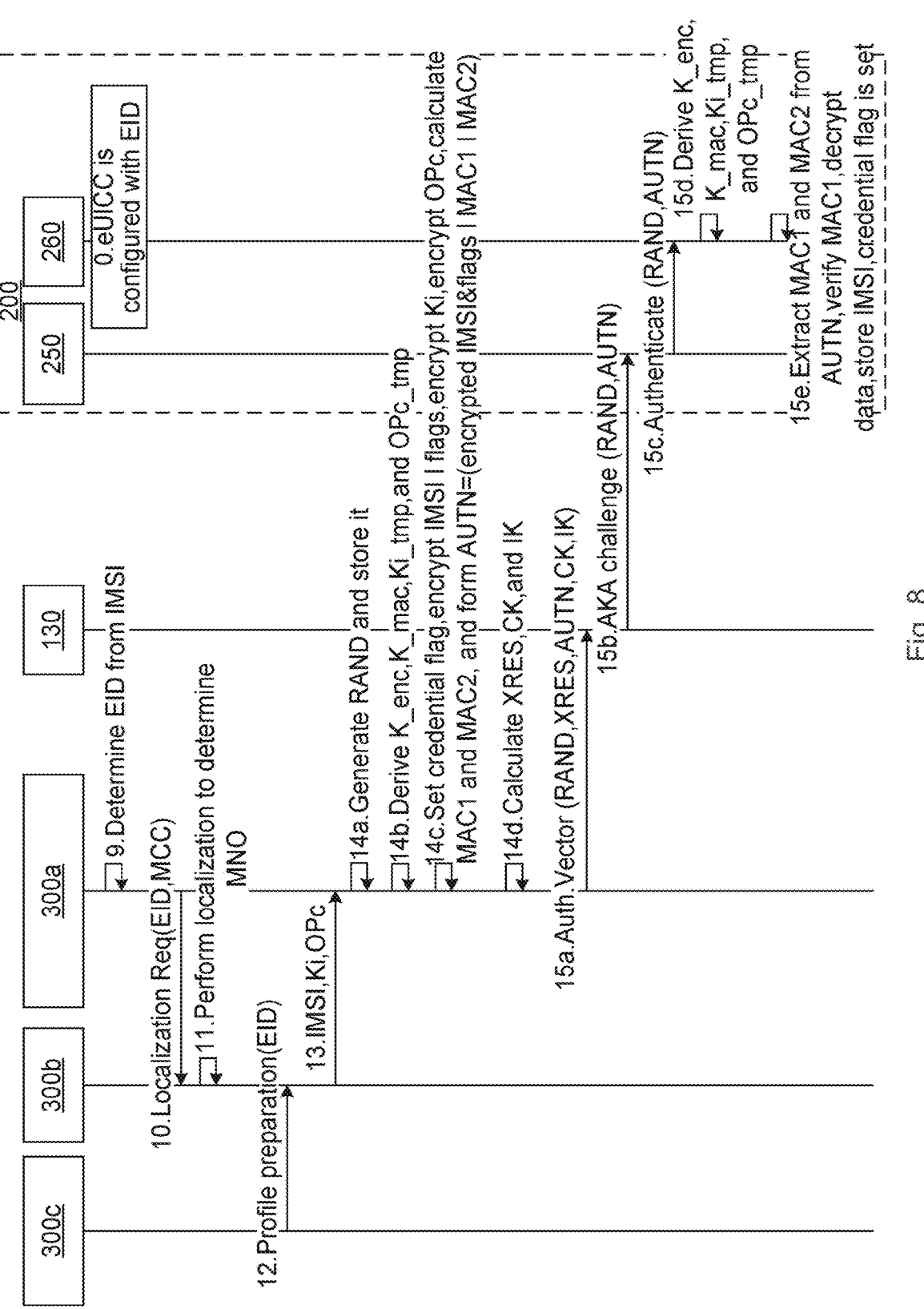
Figure 8:
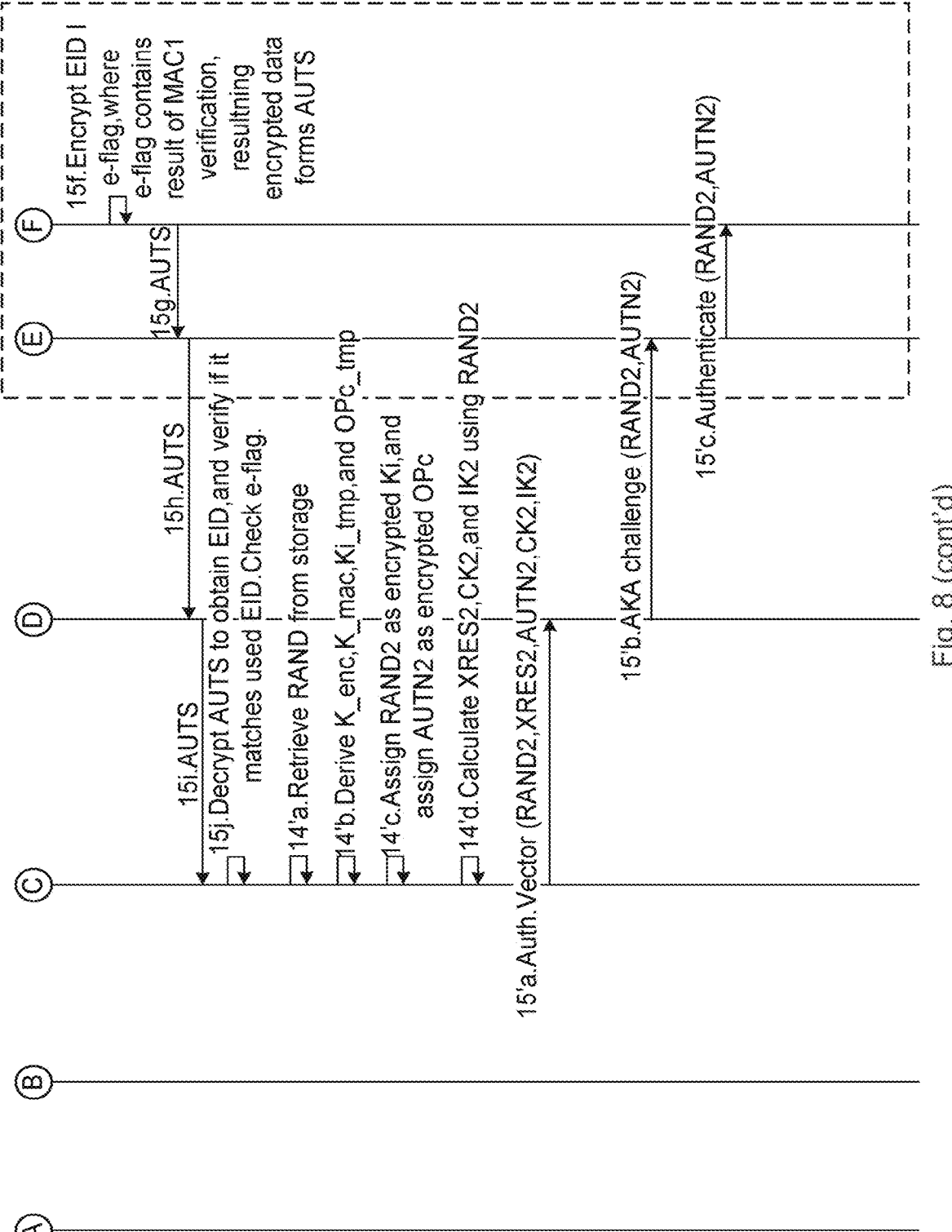
Figure 8:
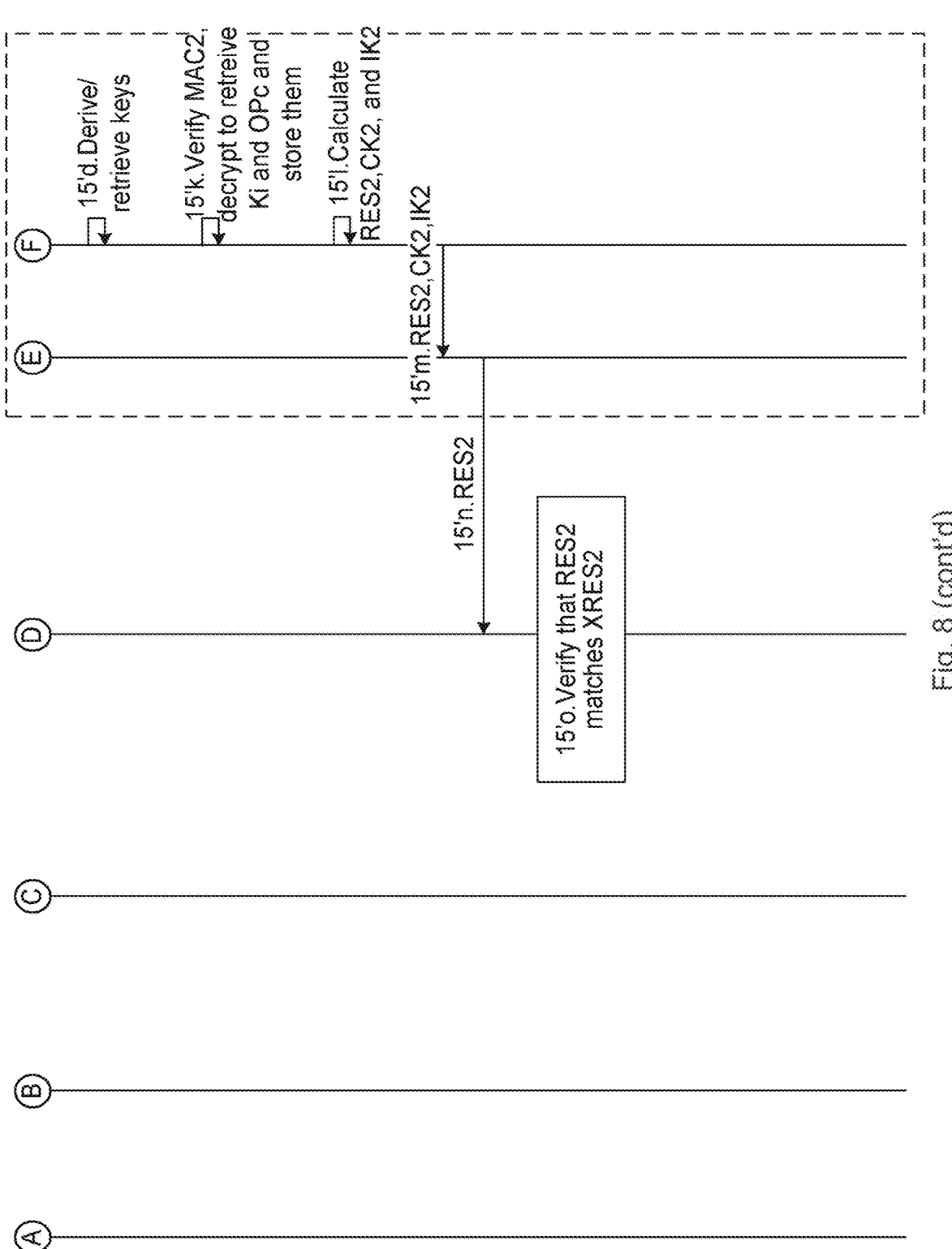

One particular embodiment where the Ki and OPc values are delivered together with the operational IMSI as part of the network access authentication to the eUICC of the communication device for use in the provisioning subscription profile based on at least some of the above disclosed embodiments will now be disclosed in detail with reference to the signalling diagram of FIG. 8.

FIG. 8 describes steps 9-15 of FIG. 4 in more detail, where steps 9-12 are identical:

Step 13: In addition to IMSI, also Ki and OPc are obtained from the eSIM localization server 300*b*.

Step 14: The authentication vector is generated.

a. Identical to step 14*a* of FIG. 5.

b. Identical to step 14*b* of FIG. 5.

c. The concatenation of IMSI and the flag field, where the credential bit is set, is encrypted using K_enc and integrity protected by computing a first MAC, denoted MAC1, using K_mac over the encrypted data. Then the received Ki is encrypted using K_enc and the OPc is encrypted using K_enc. A second MAC, denoted MAC2, is then computed over concatenation of the three ciphertexts; encrypted IMSI+flag|encrypted Ki|encrypted OPc. The encrypted Ki and encrypted OPc are stored for later use. The concatenation of the encrypted IMSI+flags, MAC1, and MAC2 forms the AUTN value of the authentication vector.

d. Identical to step 14*d* of FIG. 5.

Step 15: Network access authentication is performed.

a. Identical to step 15*a* of FIG. 5.

b. Identical to step 15*b* of FIG. 5.

c. Identical to step 15*c* of FIG. 5.

d. Identical to step 15*d* of FIG. 5.

e. The provisioning subscription profile extracts MAC1 and MAC2 from AUTN and verifies the MAC1 using K_mac. If the MAC is successfully verified, the encrypted data of AUTN is extracted and decrypted to obtain the IMSI and the flag field. It is concluded that the credential bit is set and that synchronization error should be generated.

f. The EID concatenated with the e-flag being encrypted. The e-flag denotes whether the MAC1 verification was successful (e-flag=0) or not successful (e-flag=1). The encrypted data forms the AUTS value.

g. Identical to step 15*g* of FIG. 6.

h. Identical to step 15*h* of FIG. 6.

i. Identical to step 15*i* of FIG. 6.

j. The eSIM bootstrap connectivity server 300*a* tries to decrypt the AUTS with K_enc derived in step 14*b*. If decryption is successful such that the decrypted EID matches the one selected in step 9, the e-flag is checked to determine if IMSI was successfully received by the provisioning subscription profile or not. If not, IMSI is sent again. Otherwise, continue with Ki and OPc. If decryption of AUTS fails and there are collisions continue as in FIG. 6 to determine a new EID, etc.

Upon concluding that the correct EID was received the eSIM bootstrap connectivity server 300*a* knows that the IMSI was successfully delivered and now prepares a new authentication vector for the delivery of the encrypted Ki and encrypted OPc.

Step 14': The second authentication vector is generated.

a. The RAND used in the first authentication vector is retrieved from storage (if not already available).

b. Identical to step 14*b* of FIG. 6 (performed only if derived keys not already available).

c. Encrypted Ki and encrypted OPc are retrieved from storage (if not already available). The encrypted Ki is assigned as RAND value (denoted RAND2) and the encrypted OPc is assigned as AUTN value (denoted AUTN2) of the new authentication vector.

d. The XRES, CK, and IK values for the second authentication vector (denoted XRES2, CK2, and IK2) are computed as in step 14*d* of FIG. 5 using RAND2, Ki_tmp, and OPc_tmp as input.

Step 15': Network access authentication is performed using the second authentication vector.

a. Identical to step 15*a* of FIG. 5.

b. Identical to step 15*b* of FIG. 5.

c. Identical to step 15*c* of FIG. 5.

d. Identical to corresponding step 15*d* of FIG. 5. Performed only if derived keys are not already available. The cached RAND from the previous authentication vector is used.

k. The verification of MAC2 is computed using the encrypted IMSI+flags received in the previous authentication vector, the encrypted Ki, and the encrypted OPc. If the verification is successful, the encrypted Ki and the encrypted OPc are decrypted to obtain Ki and OPc.

l. The provisioning subscription profile computes RES2, CK2, and IK2 according to ordinary network access authentication algorithms (e.g. Milenage) using RAND2, Ki_tmp, and OPc_tmp as input.

m. The RES2, CK2, and IK2 are provided as a response to the Authenticate command.

n. The modem returns the RES2 to the visiting network as a response to the authentication challenge.

o. The visiting network verifies that RES equals XRES and if this is the case authentication was successful.

The encryption of Ki and OPc may for example be performed using AES in ECB mode. The MAC2 part of the AUTN may be represented by 64 bits. For example, based on HMAC-SHA-256 (or AES-CMAC like in GSMA eSIM) using K_mac and truncated to 64 bits. The MAC1 could then only be 12 bits to fit in the 128-bit AUTN. The integrity of encrypted IMSI+flags is verified when MAC2 is verified. As an example, the full 128-bit AUTN could then be 52-bit encrypted IMSI+flags followed by 12-bit MAC1 and then followed by the 64-bit MAC2.

The strength of encryption and integrity protection of Ki and OPc is the same as the encryption and integrity protection of Ki and OPc when transferred as part of the operational subscription profile from the provisioning server 300*c*. The encryption key and MAC key are derived from an ECDH shared secret based on the private-public key pair of the eUICC and the private public key pair of the eSIM bootstrap connectivity server 300*a* of the same key size (i.e. based on 256-bit elliptic curve). A random seed is used to have the encryption key and MAC key become specific per session.

The use of the e-flag implies that EID plus e-flag is now represented by 101 bits that are encrypted according to above. AUTS is formed by taking the 101-bit encrypted data followed by 11 random bits.

As soon as the operational subscription profile has been downloaded and activated the provisioning subscription profile should clear its storage of derived or obtained keys. This is valid for all three embodiments.

Aspects of transfer of the IMSI will now be disclosed. In some cellular networks, in order to protect subscriber privacy, when IMSI is used as SUPI (Subscription Permanent Identifier), the IMSI may be delivered in encrypted and integrity protected form from the communication device to the AUSF/UDM of the home network. The encrypted SUPI is called SUCI (Subscription Concealed Identifier). Due to support for different protection schemes, the SUCI format is not fixed in size and this may be leveraged in the delivery of the EID to the eSIM bootstrap connectivity server 300*a* (as in steps 6-8 of FIG. 4).

The SUCI may either be generated by the communication device or by the USIM application of the eUICC, i.e. the provisioning subscription profile. The SUCI has the following format when the IMSI is used as the SUPI:

Byte 1: Denotes SUPI type is IMSI (value of byte is 1)

Bytes 2-4: Identifies the home network (i.e. encoding of MCC and MNC)

Bytes 5-6: A routing indicator used to route within home network

Byte 7: Denotes the SUPI protection scheme

Byte 8: Denotes the home network public key identifier

Byte 9 and onwards: denotes the protected SUPI and depends on the protection scheme used. For the standardized schemes, except for the null scheme, the scheme output consists of the public key from an ephemeral elliptic curve key pair generated by the communication device, such as the eUICC, followed by the encrypted SUPI (IMSI except for MCC and MNC) and a MAC calculated on the ephemeral public key and the encrypted SUPI. The encryption and MAC keys used to encrypt SUPI and to generate the MAC are derived from the ephemeral elliptic curve private key and a home network public key.

According to at least some of the herein disclosed embodiments, the provisioning subscription profile is configured such that the SUCI is always calculated in the eUICC (by the provisioning subscription profile). The home network key is then typically the public key of the eSIM bootstrap connectivity server 300*a*. The encryption key is derived according to the 3GPP standard from the ECDH shared secret derived from the ephemeral private key and the public key of the eSIM bootstrap connectivity server 300*a*. Instead of encrypting only the last 10 digits of the IMSI, where IMSI is a truncated hash of the EID, the 30 digits of EID may be encrypted. By sending the complete EID the risk of IMSI collisions is removed. This results in a few bytes longer SUCI than for a regular SUCI when the IMSI is used as SUPI, but this has no impact on the visiting network since for other SUPI types the SUCI can be of variable length.

By sending the full EID encrypted as part of SUCI the provisioning subscription profile never needs to derive an IMSI value that it provides to the visiting network. Still the home network (i.e. the eSIM bootstrap connectivity server 300*a*) needs to provide the IMSI to the visiting network upon successful authentication. It is now up to the eSIM bootstrap connectivity server 300*a* to select a proper IMSI from the static range of IMSIs such that two IMSIs are not used simultaneously to avoid IMSI collision detection by any visiting network.

In some of the above examples, the derivations of the keys and operator specific constants K_enc, K_mac, Ki, Ki_tmp, OPc, and OPc_tmp for a particular communication device rely on static key pairs from the eUICC of the device and eSIM bootstrap connectivity server 300*a* or provisioning server 300*c*, and on a session specific RAND value. The RAND value is not stored after the session has ended. Assuming the public key of each of the key pairs is publicly known, if any of the two private keys involved in generating the ECDH shared secret leaks to an attacker at a later point in time (after operational subscription profile download), it is possible for the attacker to compute the keys and operator specific constants listed above only if the attacker also knows the RAND value. To get the RAND, this means that the attacker must record the exchange of messages between the visiting network and the particular communication device during the network access authentication when the IMSI of the operational subscription profile is transferred (i.e., step 15 in FIG. 4). Hence, the attacker can make targeted attacks against a few particular communication devices, but cannot by stealing e.g. the private key of the eSIM bootstrap connectivity server 300a obtain keys and operator specific constants for all communication devices using the eSIM bootstrap connectivity server 300a.

In some aspects it is assumed that the private key of the eSIM bootstrap connectivity server 300a has a high degree of protection. This means that if the attacker knows the RAND and intends to derive the keys above, the attacker has higher chance of breaking the eUICC and obtain the eSIM private key of the eUICC. With the use of the SUCI it is possible to change how the keys are derived such that the derived keys cannot be obtained even with leaked eSIM private key of the eUICC and knowledge of RAND. Instead of using the static eSIM key pair of the eUICC in the derivation of keys (K_enc, K_mac, Ki, Ki_tmp, OPc, and OPc_tmp), the ephemeral key pair generated by the provisioning subscription profile for SUCI may be used. One advantage is that the ephemeral private key is session specific and not kept after the session is ended. This implies forward secrecy. The ephemeral key still needs protection during the delivery, as part of SUCI, to the eSIM bootstrap connectivity server 300a. This can be achieved by changing how the MAC included as part of the SUCI is computed. Instead of deriving the SUCI MAC key from the ephemeral key pair, the static eSIM eUICC key pair is used. This protects the integrity of the ephemeral key using the static key.

Figure 9:
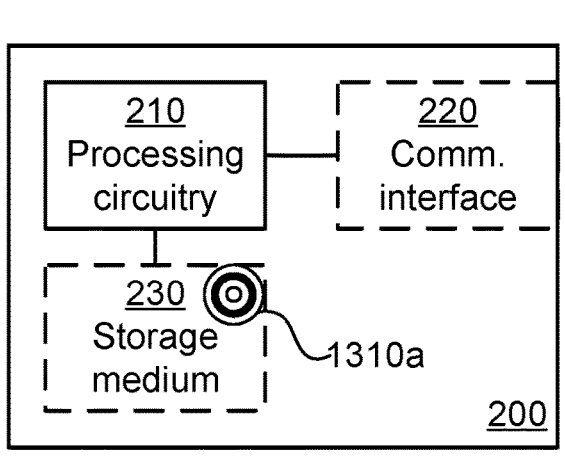
FIG. 9 is a schematic diagram showing functional units of a communication device according to an embodiment.

FIG. 9 schematically illustrates, in terms of a number of functional units, the components of a communication device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310a (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the communication device 200 to perform a set of operations, or steps, as disclosed above. For example, the storage medium 230 may store the set of operations, and the processing circuitry 210 may be configured to retrieve the set of operations from the storage medium 230 to cause the communication device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory. The identity module might form part of the storage medium.

The communication device 200 may further comprise a communications interface 220 (comprising a modem) for communications with other entities, functions, nodes, and devices, as in FIG. 1. As such the communications interface 220 may comprise one or more transmitters and receivers, comprising analogue and digital components.

The processing circuitry 210 controls the general operation of the communication device 200 e.g. by sending data and control signals to the communications interface 220 and the storage medium 230, by receiving data and reports from the communications interface 220, and by retrieving data and instructions from the storage medium 230. Other components, as well as the related functionality, of the communication device 200 are omitted in order not to obscure the concepts presented herein.

Figure 10:
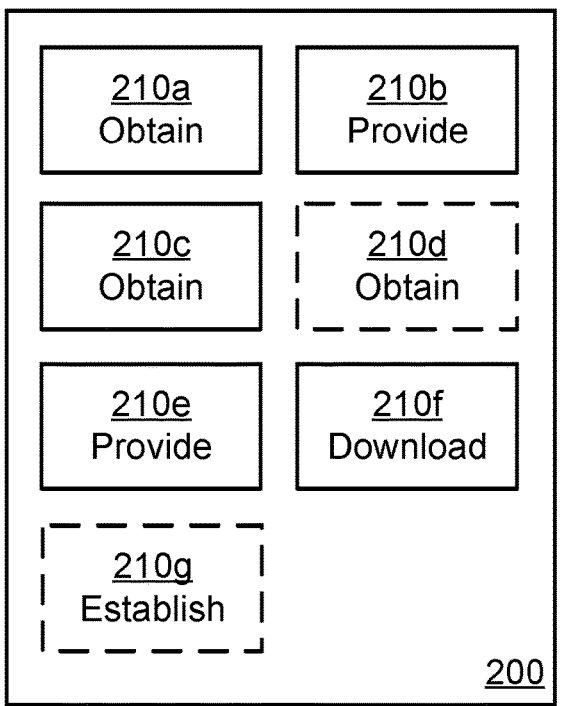
FIG. 10 is a schematic diagram showing functional modules of a communication device according to an embodiment.

FIG. 10 schematically illustrates, in terms of a number of functional modules, the components of a communication device 200 according to an embodiment. The communication device 200 of FIG. 10 comprises a number of functional modules; a first obtain module 210a configured to perform step S102, a first provide module 210b configured to perform step S104, a second obtain module 210c configured to perform step S106, a second provide module 210e configured to perform step S110, and a download module 210f configured to perform step S112. The communication device 200 of FIG. 10 may further comprise a number of optional functional modules, such as any of a third obtain module 210d configured to perform step S108, and an establish module 210g configured to perform step S114.

In general terms, each functional module 210a: 210g may be implemented in hardware or in software. Preferably, one or more or all functional modules 210a: 210g may be implemented by the processing circuitry 210, possibly in cooperation with the communications interface 220 and/or the storage medium 230. The processing circuitry 210 may thus be arranged to from the storage medium 230 fetch instructions as provided by a functional module 210a: 210g and to execute these instructions, thereby performing any steps of the communication device 200 as disclosed herein.

Figure 11:
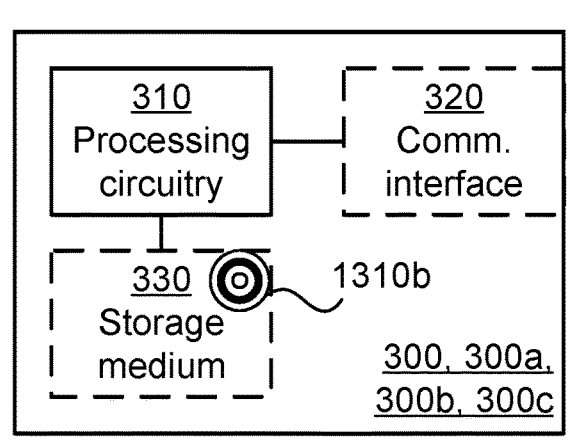
FIG. 11 is a schematic diagram showing functional units of an eSIM server according to an embodiment.

FIG. 11 schematically illustrates, in terms of a number of functional units, the components of an eSIM server 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310b (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the eSIM server 300 to perform a set of operations, or steps, as disclosed above. For example, the storage medium 330 may store the set of operations, and the processing circuitry 310 may be configured to retrieve the set of operations from the storage medium 330 to cause the eSIM server 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The eSIM server 300 may further comprise a communications interface 320 for communications with other entities, functions, nodes and devices. As such the communications interface 320 may comprise one or more transmitters and receivers, comprising analogue and digital components.

The processing circuitry 310 controls the general operation of the eSIM server 300 e.g. by sending data and control signals to the communications interface 320 and the storage medium 330, by receiving data and reports from the communications interface 320, and by retrieving data and instructions from the storage medium 330. Other components, as well as the related functionality, of the eSIM server 300 are omitted in order not to obscure the concepts presented herein.

Figure 12:
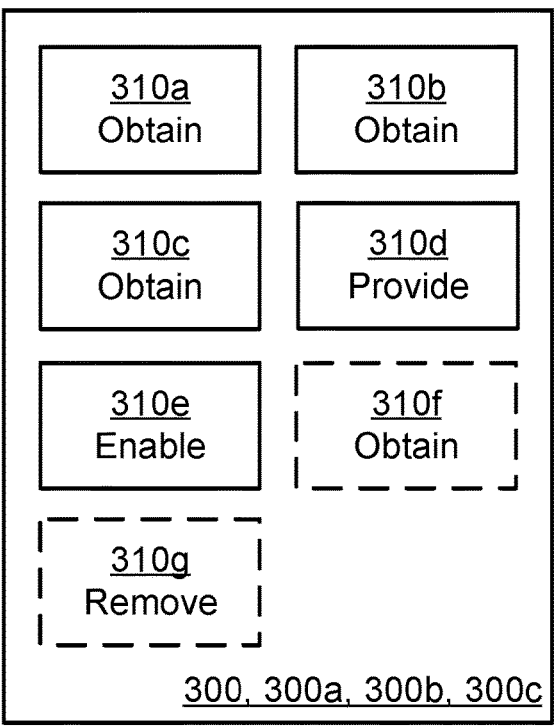
FIG. 12 is a schematic diagram showing functional modules of an eSIM server according to an embodiment.

FIG. 12 schematically illustrates, in terms of a number of functional modules, the components of an eSIM server 300 according to an embodiment. The eSIM server 300 of FIG. 12 comprises a number of functional modules; a first obtain module 310*a* configured to perform step S202, a second obtain module 310*b* configured to perform step S204, a third obtain module 310*c* configured to perform step S206, a provide module 310*d* configured to perform step S208, and an enable module 310*e* configured to perform step S210. The eSIM server 300 of FIG. 12 may further comprise a number of optional functional modules, such as any of a fourth obtain module 310*f* configured to perform step S212, and a remove module 310*g* configured to perform step S214.

In general terms, each functional module 310*a*: 310*g* may be implemented in hardware or in software. Preferably, one or more or all functional modules 310*a*: 310*g* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*: 310*g* and to execute these instructions, thereby performing any steps of the eSIM server 300 as disclosed herein.

The eSIM server 300 might comprise, or implement the functionality of, the eSIM bootstrap connectivity server 300*a*, the eSIM localization server 300*b*, and the provisioning server 300*c*.

The eSIM server 300 may be provided as a standalone device or as a part of at least one further device. Alternatively, functionality of the eSIM server 300 may be distributed between at least two devices, or nodes. These at least two nodes, or devices, may either be part of the same network or may be spread between at least two such network parts. Thus, a first portion of the instructions performed by the eSIM server 300 may be executed in a first device, and a second portion of the instructions performed by the eSIM server 300 may be executed in a second device; the herein disclosed embodiments are not limited to any particular number of devices on which the instructions performed by the eSIM server 300 may be executed. Hence, the methods according to the herein disclosed embodiments are suitable to be performed by a eSIM server 300 residing in a cloud computational environment. Therefore, although a single processing circuitry 310 is illustrated in FIG. 11 the processing circuitry 310 may be distributed among a plurality of devices, or nodes. The same applies to the functional modules 310*a*: 310*g* of FIG. 12 and the computer program 1320*b* of FIG. 13.

Figure 13:
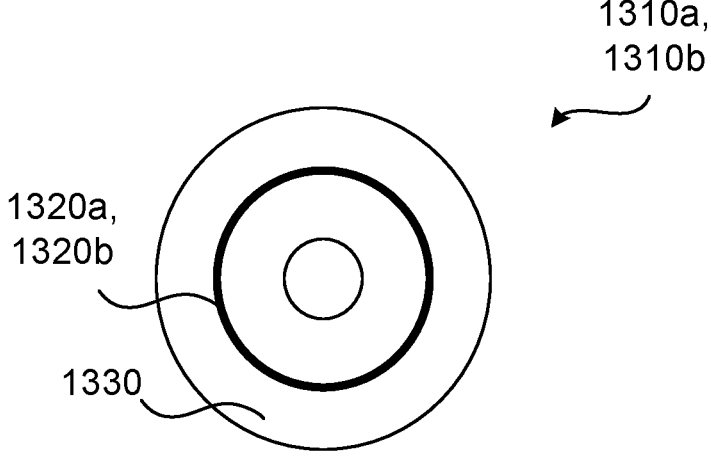
FIG. 13 shows one example of a computer program product comprising computer readable means according to an embodiment.

FIG. 13 shows one example of a computer program product 1310*a*, 1310*b* comprising computer readable means 1330. On this computer readable means 1330, a computer program 1320*a* can be stored, which computer program 1320*a* can cause the processing circuitry 210 and thereto operatively coupled entities and devices, such as the communications interface 220 and the storage medium 230, to execute methods according to embodiments described herein. The computer program 1320*a* and/or computer program product 1310*a* may thus provide means for performing any steps of the communication device 200 as herein disclosed. On this computer readable means 1330, a computer program 1320*b* can be stored, which computer program 1320*b* can cause the processing circuitry 310 and thereto operatively coupled entities and devices, such as the communications interface 320 and the storage medium 330, to execute methods according to embodiments described herein. The computer program 1320*b* and/or computer program product 1310*b* may thus provide means for performing any steps of the eSIM server 300 as herein disclosed.

In the example of FIG. 13, the computer program product 1310*a*, 1310*b* is illustrated as an optical disc, such as a CD (compact disc) or a DVD (digital versatile disc) or a Blu-Ray disc. The computer program product 1310*a*, 1310*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320*a*, 1320*b* is here schematically shown as a track on the depicted optical disk, the computer program 1320*a*, 1320*b* can be stored in any way which is suitable for the computer program product 1310*a*, 1310*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for downloading an operational subscription profile to a communication device, the method being performed by the communication device, the communication device having a device identifier (EID) and being provided with a provisioning subscription profile, the method comprising:

obtaining a temporary permanent subscription identifier (PSI) for the provisioning subscription profile, wherein the temporary PSI is based on the EID;

providing, whilst using the provisioning subscription profile, the temporary PSI to a first mobile network operator (MNO) as part of performing network attachment with the first MNO, wherein the first MNO is selected based on the temporary PSI;

obtaining, whilst using the provisioning subscription profile and as part of performing network access authentication for the network attachment, an operational PSI from an eSIM server via the first MNO;

providing, whilst using the provisioning subscription profile, the operational PSI to a second MNO as part of establishing initial network connectivity with the second MNO, wherein the second MNO is selected based on the operational PSI; and downloading, whilst using the initial network connectivity and the provisioning subscription profile, the operational subscription profile from the eSIM server via the second MNO to the communication device.

2. The method of claim 1, wherein the PSI is an IMSI.

3. The method of claim 1, wherein the method further comprises:

establishing, with the second MNO, an operational network connectivity using the operational subscription profile for data communication with the second MNO.

4. The method of claim 2, wherein the temporary IMSI comprises a truncated hash of the EID.

5. The method of claim 1, wherein the temporary PSI is a subscription permanent identifier (SUPI), wherein the SUPI comprises the EID, wherein the SUPI is encrypted and integrity protected and provided as part of a SUCI to the first MNO, and wherein the SUCI is calculated by the provisioning subscription profile.

6. The method of claim 1, wherein the communication device is provisioned with a private key and certificate for use in download of subscription profiles.

7. The method of claim 6 wherein obtaining the credentials comprises deriving the credentials from the private key of the communication device and the public key of the eSIM server.

8. The method of claim 6, wherein the encryption key and MAC key are derived from the private key of the communication device and the public key of the eSIM server.

9. The method of claim 6, wherein the credentials, encryption key, and MAC key are derived using an ephemeral private key generated by the provisioning subscription profile and the public key of the eSIM server, and wherein the ephemeral public key corresponding to the ephemeral private key is delivered to the eSIM server as part of SUCI.

10. The method of claim 1, wherein the provisioning subscription profile comprises a public key of the eSIM server.

11. The method of claim 1, wherein the method further comprises:

obtaining, whilst using the provisioning subscription profile, credentials in terms of a shared secret, Ki, between the communication device and the second MNO and an operator-specific constant, OPc, for use by the provisioning subscription profile as part of network access authentication for establishing the initial network connectivity.

12. The method of claim 11, wherein values of the credentials are identical to values of the credentials for the operational subscription profile.

13. The method of claim 12, wherein the values of the credentials are independent from properties of the eSIM server.

14. The method of claim 13, wherein the credentials are obtained by the communication device together with the operational PSI as part of performing network access authentication for the network attachment.

15. The method of claim 13, wherein the operational PSI and credentials are encrypted and integrity protected when transferred from the eSIM server to the communication device as part of the network access authentication parameters, and wherein obtaining the operational PSI and credentials comprises deriving an encryption key and a MAC key, and decrypting and verifying the encrypted and integrity protected operational PSI and credentials using said keys.

16. The method of claim 11, wherein values of the credentials for the provisioning subscription profile are different from values of the credentials for the operational subscription profile.

17. A method for enabling download of an operational subscription profile to a communication device, the method being performed by an eSIM server, the eSIM server having access to a list of device identifiers, EIDs, and information of a temporary permanent subscription identifier (PSI) for each EID in the list, the method comprising:

obtaining, from the communication device using a provisioning subscription profile and having an EID from the list of EIDs, one of the temporary PSIs as part of network attachment being performed between the communication device and a first mobile network operator, MNO;

obtaining, from the temporary PSI, the EID of the communication device;

obtaining an operational subscription profile and an operational PSI for the communication device based on the EID of the communication device;

providing the operational PSI towards the communication device as part of performing network access authentication for the network attachment; and enabling download, upon an initial network connectivity having been established for the communication device using the provisioning subscription profile and the operational PSI, of the operational subscription profile to the communication device.

18. A communication device for downloading an operational subscription profile to the communication device, the communication device having a device identifier (EID) and being provided with a provisioning subscription profile, the communication device comprising processing circuitry, the processing circuitry being configured to cause the communication device to:

obtain a temporary permanent subscription identifier (PSI) for the provisioning subscription profile, wherein the temporary PSI is based on the EID;

provide, whilst using the provisioning subscription profile, the temporary PSI to a first mobile network operator (MNO) as part of performing network attachment with the first MNO, wherein the first MNO is selected based on the temporary PSI;

obtain, whilst using the provisioning subscription profile and as part of performing network access authentication for the network attachment, an operational PSI from an eSIM server via the first MNO;

provide, whilst using the provisioning subscription profile, the operational PSI to a second MNO as part of establishing initial network connectivity with the second MNO, wherein the second MNO is selected based on the operational PSI; and download, whilst using the initial network connectivity and the provisioning subscription profile, the operational subscription profile from the eSIM server via the second MNO to the communication device.

19. An eSIM server for enabling download of an operational subscription profile to a communication device, the eSIM server having access to a list of device identifier, EIDs, and information of a temporary permanent subscription identifier (PSI) for each EID in the list, the eSIM server comprising processing circuitry, the processing circuitry being configured to cause the eSIM server to:

obtain, from the communication device using a provisioning subscription profile and having an EID from the list of EIDs, one of the temporary PSIs as part of network attachment being performed between the communication device and a first mobile network operator, MNO;

obtain, from the temporary PSI, the EID of the communication device;

obtain an operational subscription profile and an operational PSI for the communication device based on the EID of the communication device;

provide the operational PSI towards the communication device as part of performing network access authentication for the network attachment; and enable download, upon an initial network connectivity having been established for the communication device using the provisioning subscription profile and the operational PSI, of the operational subscription profile to the communication device.

* * * * *